(12) United States Patent
Jiang

(10) Patent No.: US 12,162,256 B2
(45) Date of Patent: *Dec. 10, 2024

(54) FUSION PANEL AND APPLICATION

(71) Applicant: Jinglei Jiang, Zhejiang (CN)

(72) Inventor: Jinglei Jiang, Zhejiang (CN)

( * ) Notice: Subject to any disclaimer, the term of this patent is extended or adjusted under 35 U.S.C. 154(b) by 306 days.

This patent is subject to a terminal disclaimer.

(21) Appl. No.: 17/630,158

(22) PCT Filed: Jul. 27, 2020

(86) PCT No.: PCT/CN2020/104798
§ 371 (c)(1),
(2) Date: Jan. 27, 2022

(87) PCT Pub. No.: WO2021/013266
PCT Pub. Date: Jan. 28, 2021

(65) Prior Publication Data
US 2022/0281204 A1     Sep. 8, 2022

(30) Foreign Application Priority Data

Jul. 25, 2019 (CN) .......................... 201910678593.X
Jul. 22, 2020 (CN) .......................... 202010713064.1
Jul. 22, 2020 (CN) .......................... 202021465018.6

(51) Int. Cl.
*B32B 3/28* (2006.01)
*B29C 49/00* (2006.01)
(Continued)

(52) U.S. Cl.
CPC ............ *B32B 3/28* (2013.01); *B29C 49/0031* (2013.01); *B32B 3/30* (2013.01); *B32B 5/18* (2013.01); *B32B 27/065* (2013.01); *B32B 27/08* (2013.01); *B32B 27/20* (2013.01); *B32B 27/327* (2013.01); *A47B 2200/001* (2013.01); *B29L 2007/002* (2013.01); *B32B 2250/242* (2013.01);
(Continued)

(58) Field of Classification Search
CPC ..... B32B 3/28; B32B 27/08; B32B 2250/242; B32B 2307/584; B32B 3/30; B32B 27/327; B32B 2323/043; A47B 13/08; A47B 2200/001; B29C 49/0031; B29L 2007/002
See application file for complete search history.

(56) References Cited

U.S. PATENT DOCUMENTS 6,223,945 B1 * 5/2001 Giblin .................... B65D 23/10
220/62.22
2016/0270521 A1 * 9/2016 Jiang ....................... A47B 13/08
2020/0290324 A1 * 9/2020 Calvin ................. B32B 27/365

FOREIGN PATENT DOCUMENTS

WO    WO-2014186922 A1 * 11/2014 ............. A47B 13/08
WO    WO-2019067654 A1 *  4/2019 ........... B29C 43/203

* cited by examiner

*Primary Examiner* — Jasper Saberi
(74) *Attorney, Agent, or Firm* — David & Raymond Patent Firm; Raymond Y Chan

(57) ABSTRACT

A fusion panel includes a first panel member, a second panel member, a first layer and a second layer, wherein the first layer is overlapped and fused with the second layer. Edges of the first panel member and the second panel member are connected to each other to form a cavity therebetween with a hollow structure. The first panel member is constructed to have at least one of a portion of the first layer and a portion of the second layer. The second panel member is constructed to have at least one of a portion of the first layer and a portion of the second layer.

19 Claims, 9 Drawing Sheets

(51) Int. Cl.
*B32B 3/30* (2006.01)
*B32B 5/18* (2006.01)
*B32B 27/06* (2006.01)
*B32B 27/08* (2006.01)
*B32B 27/20* (2006.01)
*B32B 27/32* (2006.01)
*B29L 7/00* (2006.01)

(52) U.S. Cl.
CPC ... *B32B 2262/101* (2013.01); *B32B 2264/104* (2013.01); *B32B 2479/00* (2013.01)

FUSION PANEL AND APPLICATION

CROSS REFERENCE OF RELATED APPLICATION

This is a non-provisional application that claims priority to international application number PCT/CN2020/104798, international filing date Jul. 27, 2020, which claims priority to first Chinese application number CN 201910678593.X, filing date Jul. 25, 2019, second Chinese application number CN 202010713064.1, filing date Jul. 22, 2020, and third Chinese application number CN 202021465018.6, filing date Jul. 22, 2020, the entire contents of each of which are expressly incorporated herein by reference.

BACKGROUND OF THE PRESENT INVENTION

Field of Invention

The present invention relates to a field of panels, and more particularly to a fusion panel constructed to have at least two layers being fused along a connection between the layers.

Description of Related Arts

Panels are commonly used in our daily products, such as tabletop panels, chair seat panels, panels for toys and wall panels. Most of the current panels are made of plastic, wherein the plastic panels have the advantages comparing with the wooden panels and metal panels that the density of the plastic panel is relatively low, such that the weight of the plastic panel is lighter than that of the panel made of other materials.

Blow molding is one of the common technologies for manufacturing the plastic panels, wherein the blow molding method has the advantages of low production cost and relatively fast production speed. During the blow molding process, air or gas is injected into the hollow space of the plastic material, such that under the air pressure, the plastic material is blown and is biased against an inner wall of the mold to obtain a desired shape of the plastic product. However, most of the plastic products, especially for those manufactured by blow molding, have relatively low strength and have weak support for a heavy load. The plastic panel will be collapsed when the heavy load is applied thereon or after a period of use time.

In order to enhance the structural strength of the plastic panel, a plurality of reinforcing ribs are commonly provided to reinforce the strength of the plastic panel so as to support the plastic panel and to prevent the plastic panel from being collapsed. In order to ensure the stiffness of the reinforcing ribs, the reinforcing ribs are made of metal. In other words, the overall weight of the plastic panel with the metal reinforcing ribs will be substantially increased so as to reduce the portability of the plastic panel. Furthermore, the metal reinforcing ribs can only support the plastic panel at certain areas where the metal reinforcing ribs are located, such that other non-supported areas of the plastic panel are weak and will be collapsed.

Alternatively, some panel manufacturers modify the composition of the plastic panel, such as adding other materials into the plastic material, to improve the strength of the plastic panel. In fact, the plastic panel not only requires to meet the requirements of the manufacturing process but also provides a surface treatment with oil resistant and a predetermined elasticity for impact absorption. The material must also enhance the strength of the plastic panel at the mean time, such that the requirements of the plastic panel are high to fulfill the current needs.

SUMMARY OF THE PRESENT INVENTION

In order to solve the above mentioned technical problems of the existing plastic panels, the present invention provides a technical solution for a blow molded panel with better impact resistance, light weight, and rigid structure.

Another advantage of the invention is to provide a blow molded panel, which is constructed to have a double-layer panel structure having a better impact resistance, rigid structure and light weight.

Another advantage of the invention is to provide a blow molded panel, which is constructed to have a triple-layer panel structure having a better impact resistance, rigid structure and light weight.

According to the present invention, the foregoing and other objects and advantages are attained by a blow molded panel, comprising an upper panel member and a lower panel member, wherein the upper panel member and the lower panel member are spaced part with each other to form a hollow structure, wherein each of the upper panel member and the lower panel member comprises an outer layer and an inner layer, wherein a portion of the lower panel member is stretched and recessed in a direction toward the upper panel until the inner layer of the lower panel member is fused with the inner layer of the upper panel member to form a plurality of contact supporting structure.

Preferably, each of the upper panel member and the lower panel member comprises an outer layer, an intermediate layer and an inner layer, wherein a portion of the lower panel member is stretched and recessed in a direction toward the upper panel until the inner layer of the lower panel member is fused with the inner layer of the upper panel member to form a plurality of contact supporting structure.

In order to improve the strength of an edge structure of the blow molded panel, the upper panel member has an outer bending wall downwardly bent from an outer edge thereof, and the lower panel member has an inner bending wall downwardly bent from an outer edge thereof, wherein a bottom of the inner layer of the outer bending wall and a bottom of the inner layer of the inner bending wall are integrated with each other.

In order to improve the structural strength of the blow molded panel, the contact supporting structure can be embodied as a point structure or an elongated strip structure.

Preferably, at least one reinforcing rib is provided at the contact supporting structure.

Preferably, the contacting supporting structure is constructed to have two reinforcing ribs and three corresponding peak points, wherein the reinforcing ribs and the peak points are arranged in alternating manner.

According to the preferred embodiment, each panel member of the blow molded panel of the present invention has a double-layer structure, wherein the outer layer of each of the upper and lower panel members is made of high density polyethylene, and the inner layer of each of the upper and lower panel members is made of a mixture of high density polyethylene, metallocene polyethylene and calcium carbonate, or a mixture of high-density polyethylene, metallocene polyethylene and glass fiber.

Preferably, for the inner layer, the mass percentage of the metallocene polyethylene is 10-15%, the mass percentage of the calcium carbonate is 15-20%, and the rest is high density polyethylene. Alternatively, the mass percentage of the metallocene polyethylene is 10-15%, the mass percentage of the glass fiber is 15-25%, and the rest is high density polyethylene.

According to the double panel members with triple layer configuration of the blow molded panel, the outer layer of each of the upper panel member and the lower panel member is made of high density polyethylene, and the intermediate layer of each of the upper panel member and the lower panel member is made of a mixture of high density polyethylene and calcium carbonate or a mixture of high density polyethylene and glass fiber, and the inner layer of each of the upper panel member and the lower panel member is made of metallocene polyethylene.

According to one embodiment, for the intermediate layer, the mass percentage of high density polyethylene is 70-85%, and the mass percentage of calcium carbonate is 15-30%.

According to another embodiment, for the intermediate layer, the mass percentage of the high density polyethylene is 60-85%, and the mass percentage of the glass fiber is 15-40%.

Compared with the prior art, the advantage of the present invention is that the blow molded panel is constructed to have the upper and lower panel members to form a hollow structure, so as to provide a lightweight, rigid, and impact-resistant panel structure. At least a portion of the lower panel member is stretched and recessed in the direction toward the upper panel member until the inner layer of the lower panel member and the inner layer of the upper panel member are fused with each other to form a plurality of contact supporting structures distributed evenly to improve the structural strength of the blow molded panel. The outer layer can be made of materials with high surface strength, scratch resistance, and oil resistance. The inner layer can be made of materials with low thermoplastic shrinkage ratio to provide frame support. When adding the intermediate layer which is made of high rigidity, a predetermined elasticity and energy absorption material, the intermediate layer is able to provide a buffering effect to minimize the damage to the panel due to impact and drop and to further improve the overall structural strength of the blow molded panel.

Another advantage of the invention is to provide a fusion panel and its applications, wherein the fusion panel is constructed to have at least two layers being fused along a connection between the layers, such that the layers are difficult to separate to enhance the fusing strength of the fusion panel.

Another advantage of the invention is to provide a fusion panel and its applications, wherein the layers are made of different materials that each material has its own excellent ability, such that the layers are compounded together to enhance the overall performance.

Another advantage of the invention is to provide a fusion panel and its applications, wherein the layers of the fusion panel can be directly fused with each other without using any connecting media, such as glue, so as to further reduce the thickness or weight of the fusion panel.

Another advantage of the invention is to provide a fusion panel and its applications, wherein the fusion panel comprises a first panel member and a second panel member spaced apart from each other to form a hollow structure, wherein the second panel member forms at least one supporting structure to support the first panel member, wherein the supporting structure is fused with the first panel member to enhance the connection strength between the first panel member and the second panel member.

Another advantage of the invention is to provide a fusion panel and its applications, wherein since the supporting structure is fused with the first panel member, the thickness at the connection between the supporting structure and the first panel member will be reduced to enhance heat dissipation during the manufacturing process of the fusion panel.

Another advantage of the invention is to provide a fusion panel and its applications, wherein the fusion panel can be prepared by a blow molding process, wherein the materials of the layers are fused with each other after extrusion to closely combined with each other under air pressuring of the blow molding process.

Another advantage of the invention is to provide a fusion panel and its applications, wherein the inner layer and/or the intermediate layer of the fusion panel can be made of recycled materials to reduce the material costs of the fusion panel.

Another advantage of the invention is to provide a fusion panel and its applications, wherein the outer layer of the fusion panel can be made of materials having better scratch resistance, such that the scratch resistance requirement of the inner layer or the intermediate layer of the fusion panel can be lowered.

Another advantage of the invention is to provide a fusion panel and its applications, wherein the inner layer of the fusion panel can be made of a material having better strength to support the outer layer, such that the strength requirement of the outer layer of the fusion panel can be lowered.

Another advantage of the invention is to provide a fusion panel and its applications, wherein the intermediate layer of the fusion panel can be made of materials having better energy absorption performance for absorbing any external impact, such that the energy absorption requirements of the outer layer and the inner layer of the fusion panel can be lowered.

According to the present invention, the foregoing and other objects and advantages are attained by a fusion panel, comprising:

a first panel member;

a second panel member;

a first layer; and a second layer, wherein the first layer is overlapped and fused with the second layer, wherein edges of the first panel member and edges of the second panel members are fused together to form a cavity therewithin for forming a hollow structure, wherein the first panel member is constructed to have at least one of a portion of the first layer and a portion of the second layer, wherein the second panel member is constructed to have at least one of a portion of the first layer and a portion of the second layer.

According to the preferred embodiment, wherein at least a portion of the second panel member is extended toward the cavity to form at least one supporting structure, wherein the first panel member is supported by the supporting structure, wherein at least a portion of the supporting structure is fused with the first panel member.

According to the preferred embodiment, wherein at least a portion of the second panel member is extended toward the cavity to form at least one supporting structure, wherein the first panel member is supported by the supporting structure, wherein a thickness of a connection between the first panel member and the supporting structure is smaller than a sum of a thickness of the first panel member at other portions and a thickness of the supporting structure. In other words, the overall thickness of the first panel member at the connection portion and the supporting structure is smaller than the overall thickness of the first panel member at the other portions and the supporting structure.

According to the preferred embodiment, wherein the fusion panel further comprises a third layer, wherein the second layer is sandwiched between the first layer and the third layer, wherein the third layer is embodied as an inner layer while the first layer is embodied as an outer layer, wherein the second layer and the first layer is fused with each other in a surface-to-surface manner, wherein the second layer and the third layer is fused with each other in a surface-to-surface manner, wherein the first panel member is constructed to have at least one of a portion of the first layer, a portion of the second layer and a portion of the third layer, wherein the second panel member is constructed to have at least one of a portion of the first layer, a portion of the second layer, and a portion of the third layer.

According to the preferred embodiment, wherein the layers of the second panel member are stretched and recessed at the same time to form the supporting structure.

According to the preferred embodiment, wherein the supporting structure comprises a supporting top wall and a supporting sidewall, wherein the supporting top wall is contacted with the first panel member to support the first panel member, wherein the supporting top wall forms at least one peak point, wherein the peak point of the supporting structure is fused with the first panel member.

According to the preferred embodiment, wherein the supporting structure is constructed to have at least a portion of the first layer, at least a portion of the second layer and at least a portion of the third layer, the first panel member is constructed to have at least a portion of the first layer, at least a portion of the second layer and at least a portion of the third layer, wherein the third layer of the supporting structure and the third layer of the first panel member are fused with each other.

According to the preferred embodiment, wherein the first layer is made of high density polyethylene, and the second layer is made of a mixture of high density polyethylene and calcium carbonate or a mixture of high density polyethylene and glass fiber, and the third layer is made of metallocene polyethylene.

According to the preferred embodiment, wherein the first layer is made of high density polyethylene, wherein two or more of the supporting structures are provided, wherein the supporting structures are arranged in an interval manner and in a staggered manner.

According to the preferred embodiment, wherein the fusion panel further comprises a reinforcing rib, wherein the supporting structure comprises a supporting top wall and a supporting sidewall, wherein the supporting top wall is contacted with the first panel member to support the first panel member, wherein the supporting structure further has a recessed cavity formed around the supporting sidewall, wherein the reinforcing rib is disposed in the recessed cavity around the supporting sidewall.

According to the preferred embodiment, wherein the second layer is embodied as a foam layer.

In accordance with another aspect of the invention, the present invention comprises a tabletop for connecting to a leg device to form a table, comprising:

a first panel member;
a second member;
a first layer; and
a second layer, wherein edges of the first panel member and edges of the second panel members are fused together to form a cavity therewithin for forming a hollow structure, wherein the first panel member is constructed to have at least one of a portion of the first layer and a portion of the second layer, wherein the second panel member is constructed to have at least one of a portion of the first layer and a portion of the second layer, wherein the second panel member is adapted for coupling to the leg device to form the table.

In accordance with another aspect of the invention, the present invention comprises a table, comprising:

at least a leg device; and
a tabletop being connected to the leg device, wherein the tabletop comprises:
a first panel member;
a second member;
a first layer; and
a second layer, wherein edges of the first panel member and edges of the second panel members are fused together to form a cavity therewithin for forming a hollow structure, wherein the first panel member is constructed to have at least one of a portion of the first layer and a portion of the second layer, wherein the second panel member is constructed to have at least one of a portion of the first layer and a portion of the second layer.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It is appreciated that the terms "longitudinal", "transverse", "upper", "lower", "front", "rear", "left", "right", "vertical", "horizontal", "top", "bottom", "interior" and "exterior" and in the following description refer to the orientation or positioning relationship in the accompanying drawings for easy understanding of the present invention without limiting the actual location or orientation of the present invention. Therefore, the above terms should not be an actual location limitation of the elements of the present invention.

It is appreciated that the terms "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of the present invention.

The present invention will be further described in detail below with reference to the embodiments of the drawings.

Embodiment 1

Figure 1:
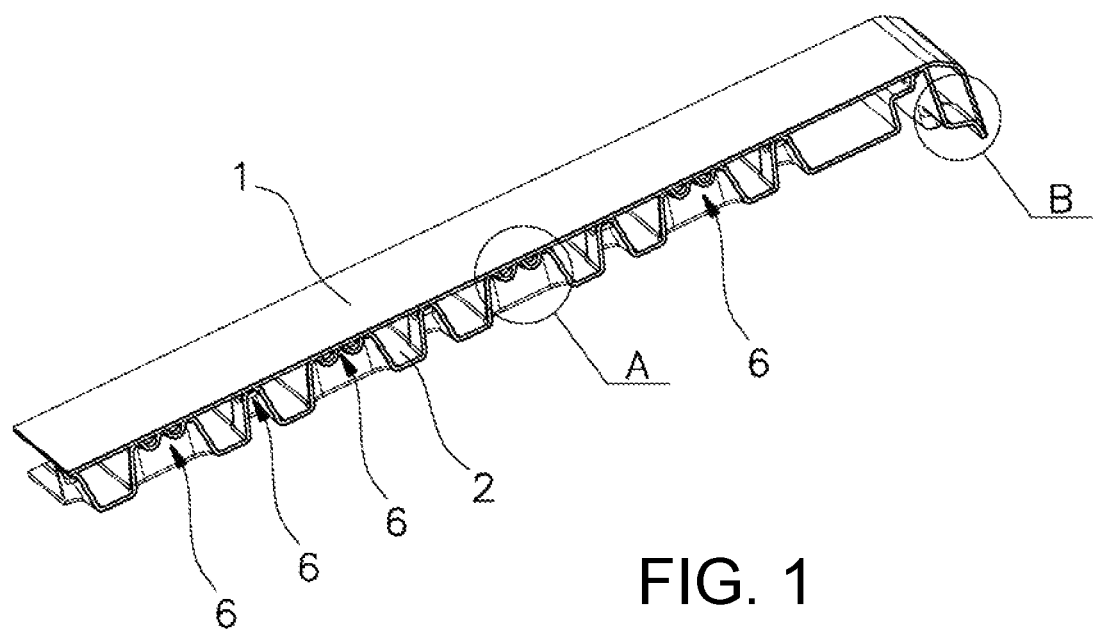
FIG. 1 is a sectional perspective view of a blow molded panel according to a first preferred embodiment of the present invention.
Figure 2:
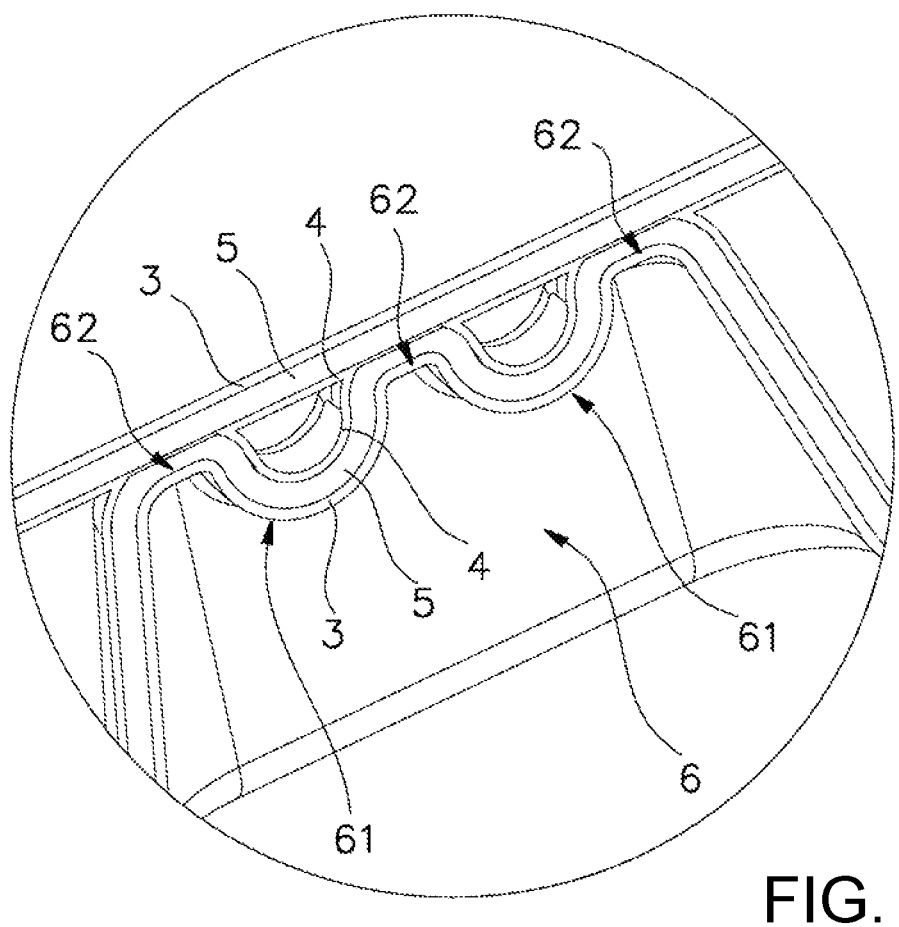
FIG. 2 is an enlarged perspective view of the blow molded panel at section A of FIG. 1 according to the above first preferred embodiment of the present invention.
Figure 3:
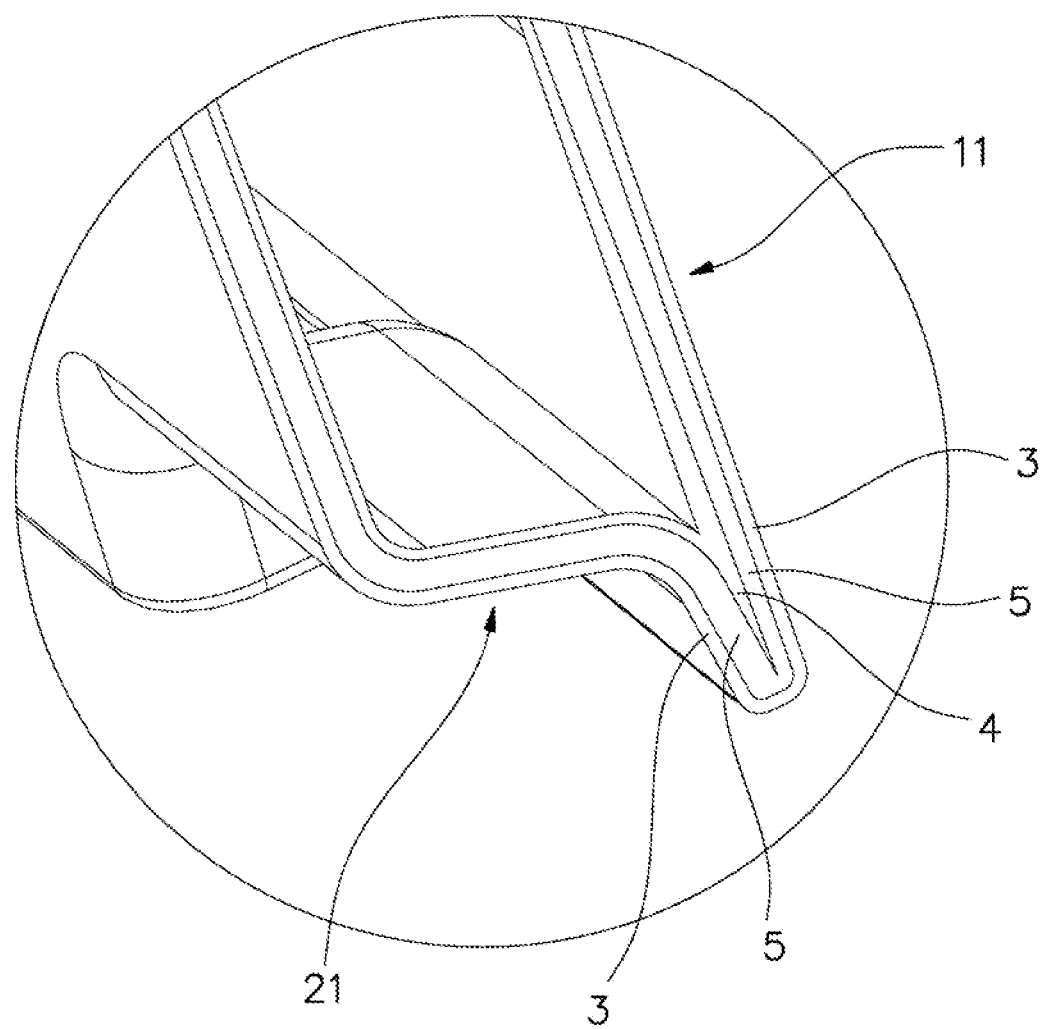
FIG. 3 is an enlarged perspective view of the blow molded panel at section B of FIG. 1 according to the above first preferred embodiment of the present invention.

Referring to FIGS. 1 to 3 of the drawings, a blow molded panel according to a first preferred embodiment of the present invention is illustrated, wherein the blow molded panel comprises an upper panel member 1 and a lower panel member 2. The upper and lower panel members 1, 2 are space apart with each other to form a hollow structure through a blow molding process.

According to the preferred embodiment, each of the upper and lower panel members 1, 2 is constructed to have a triple layer structure. In other words, each of the upper and lower panel members 1, 2 comprises an outer layer 3, an intermediate layer 5, and an inner layer 4 sandwiched together. In addition, the lower panel member 2 has a square wave configuration that portions of the lower panel member 2 are extended upwardly to the upper panel member 1, wherein the lower panel member 2 is stretched and recessed to the upper panel member 1 at a position that the inner layer 4 of the lower panel member 2 is fused with the inner layer 4 of the upper panel member 1 to form a plurality of predetermined contact supporting structures 6 distributed underneath the upper panel member 1.

FIG. 3 illustrates the edge structure of the blow molded panel, wherein the upper panel member 1 further comprises an outer bending wall 11 being bent downwardly at an outer edge of the upper panel member 1. The lower panel member 2 further comprises an inner bending wall 21 being bent downwardly at an outer edge of the lower panel member 2. A bottom of the inner layer 4 of the outer bending wall 11 and a bottom of the inner layer 4 of the inner bending wall 21 are integrated with each other.

According to the preferred embodiment, each of the contact supporting structures 6, having a sinusoidal waveform, is configured to have an elongated shape or strip shape, wherein each of the contact supporting structures 6 comprises two reinforcing ribs 61. As shown in FIGS. 1 and 2, the contact supporting structure 6 is configured to have two reinforcing ribs 61 and three contacting points 62 alternating with the reinforcing ribs 61.

For the raw material structure of the double panel members with triple layer configuration of the blow molded panel, the outer layers 3 of the upper and lower panel members 1, 2 are made of high density polyethylene. The intermediate layers 5 of the upper and lower panel members 1, 2 are made of a mixture of high density polyethylene and calcium carbonate or a mixture of high density polyethylene and glass fiber. The inner layers 4 of the upper and lower panel members 1, 2 are made of metallocene polyethylene.

As a result, the outer layer 3 has the properties of high surface strength, scratch resistance, and oil resistance. The inner layer 4 has a low thermoplastic shrinkage ratio and provides rigid frame structure support. The intermediate layer 5 has a predetermined elasticity and energy absorption and high strength, and provides an effective buffering effect to any impact and drop which may damage the panel.

In one embodiment, when the intermediate layer 5 is made of a mixture of high density polyethylene and calcium carbonate, the mass percentage of high density polyethylene is 70-85%, and the mass percentage of calcium carbonate is 15-30%.

In one embodiment, when the intermediate layer 5 is made of a mixture of high density polyethylene and glass fiber, the mass percentage of high density polyethylene is 60-85%, and the mass percentage of glass fiber is 15-40%.

For the raw material structure of the double panel members with triple layer configuration of the blow molded panel, the inner layer 4 can be broken to absorb the energy when an external force is applied on the outer layer 3 due to the high impact or drop. Due to the material properties of the intermediate layer 5, the intermediate layer 5 provides a relatively high resilient tensile force to restore the inner layer 4 so as to ensure the integrity of the panel and the function of the panel. Therefore, the hollow composite panel has the advantages of high surface strength, high flatness, excellent impact resistance, excellent deformation resistance, excellent rigid structure, higher performance and long service life.

The multi-panel multi-layer configuration of the blow molded panel of the present invention is able to apply to many different applications. For example, the blow molded panel can be applied to tables and chairs, such as tabletop panels, seat panels, and back panels etc. The blow molded panel can also be applied to other products where the panel is easy to break. The blow molded panel can be applied to building materials such as wall partitions, wall panels, door panels, fence panels, outdoor floors, insulation panels, and partition panels.

According to the first preferred embodiment of the present invention, the parameters of the high density polyethylene used in the outer layer 3 are shown as follows: melting rate: 1.5 g/10 min, bending strength: 900 MPa, Shore D69.

According to the first preferred embodiment of the present invention, the parameters of the high density polyethylene used in the intermediate layer 5 are as follows: melting rate: 0.35 g/10 min, bending strength: 1050 MPa, Shore D63.

According to the first preferred embodiment of the present invention, the parameters of the metallocene polyethylene used in the inner layer 4 are as follows:

Melting rate: 2.0 g/10 min;

Elongation at break: 420% in longitudinal direction and 830% in transverse direction;

Tensile strength at break: longitudinal 62 MPa, transverse 25 MPa;

Dart impact strength <48 g;

Eikmandorf tearing strength: 21° C. in longitudinal direction, 430° C. in transverse direction.

Furthermore, a person who skilled in the art should understand that, as an example of a simplified application, the outer layer, the intermediate layer and the inner layer can be made of the same material, or the material with different grades or different levels. For example, the outer layer, the intermediate layer and the inner layer can be made of high density polyethylene. In addition, the outer layer can be made of material having high hardness level and bright color, the intermediate layer can be a composite layer, and the inner layer can be made of recycled materials and a predetermined proportion of structural filling materials. These configurations can save the material cost and allow quick color changing capability.

Embodiment 2

Figure 4:
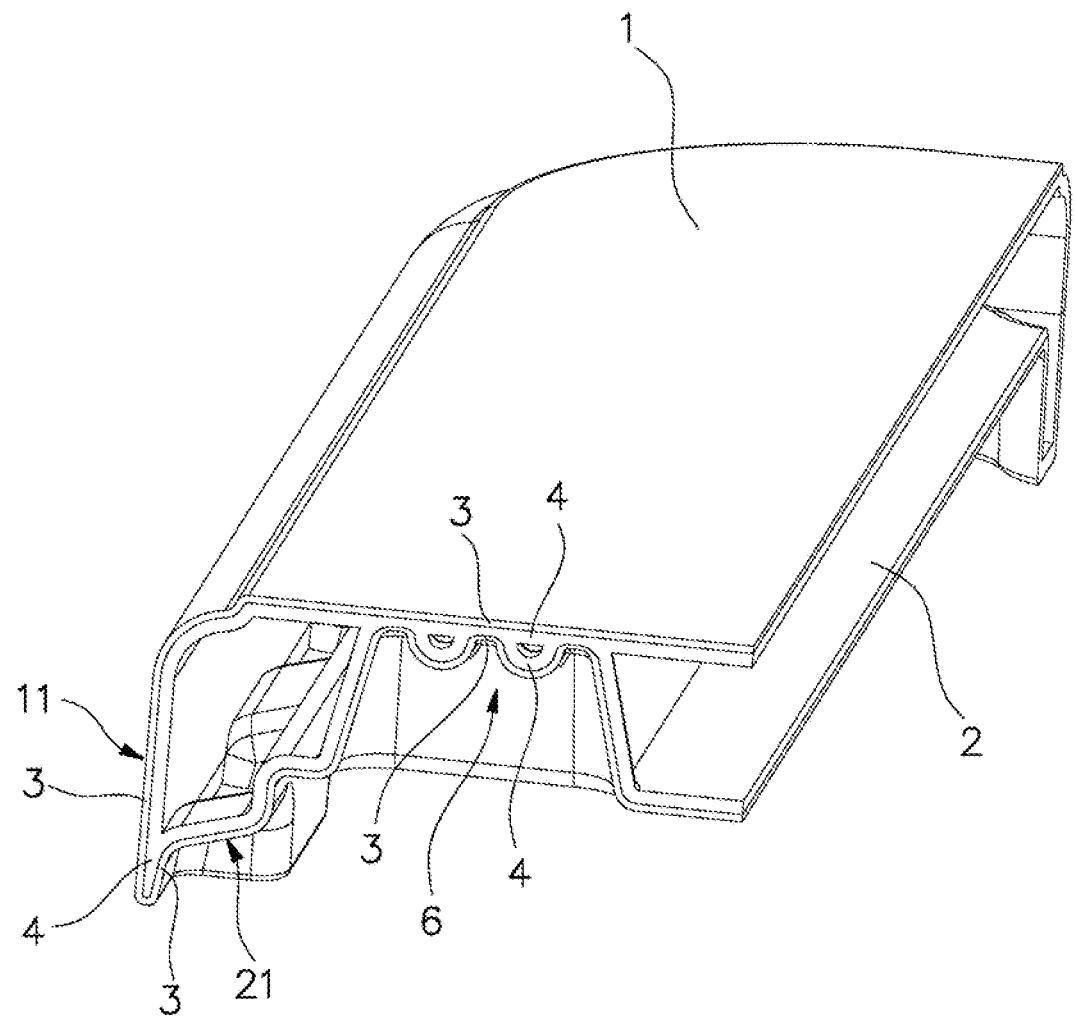
FIG. 4 is a sectional perspective view of a blow molded panel according to a second preferred embodiment of the present invention.

As shown in FIG. 4, the blow molded panel according to a second embodiment illustrates an alternative mode, wherein the blow molded panel comprises an upper panel member 1 and a lower panel member 2 each having a double-layer configuration. In other words, each of the upper and lower panel members 1, 2 is constructed to have an outer layer 3 and an inner layer 4. Accordingly, the lower panel member 2 has a square wave configuration that portions of the lower panel member 2 are extended upwardly to the upper panel member 1, wherein the lower panel member 2 is stretched and recessed to the upper panel member 1 at a position that the inner layer 4 of the lower panel member 2 is fused with the inner layer 4 of the upper panel member 1 to form a plurality of predetermined contact supporting structures 6 distributed underneath the upper panel member 1.

For the raw material structure of the double panel members with triple layer configuration of the blow molded panel, the outer layers 3 of the upper and lower panel members 1, 2 are made of high density polyethylene. The inner layers 4 of the upper and lower panel members 1, 2 are made of a mixture of high density polyethylene, metallocene polyethylene and calcium carbonate, or a mixture of high density polyethylene, metallocene polyethylene and glass fiber.

According to the second preferred embodiment of the present invention, for the inner layer 4, the mass percentage of metallocene polyethylene is 10-15%, the mass percentage of calcium carbonate is 15-20%, and the rest is high density polyethylene. Alternatively, for the inner layer 4, the mass percentage of the metallocene polyethylene is 10-15%, the mass percentage of the glass fiber is 15-25%, and the rest is high density polyethylene.

In addition, the parameters of the high density polyethylene and metallocene polyethylene applied in this embodiment can refer to the above Embodiment 1, and the description will not be expanded here.

The above descriptions are for the preferred embodiments of the present invention. It should be pointed out that for a person who skilled in the art, without departing from the principle of the present invention, various modifications or improvements can be made to the present invention. For example, the outer layer, the intermediate layer, and the inner layer of the upper layer member and the outer layer, the intermediate layer, and the inner layer of the lower layer member can be configured to have more than one layer structure, which should be within the scope of the present invention.

According to one aspect of the present invention as a modification, as shown in FIGS. 5A to 8, the present invention provides a fusion panel 1' and its manufacturing method thereof.

The fusion panel 1' is made of plastic to form a plastic panel, wherein the fusion panel 1' has an advantage same as the existing plastic products such as lightweight, and has an advantage different from the existing plastic products such as excellent structural strength.

The fusion panel 1' comprises a first layer 10' and a second layer 20', wherein the first layer 10' is overlapped on and fused with at least a portion the second layer 20', such that the layers of the fusion panel 1' are closely combined together.

The first layer 10' and the second layer 20' are overlapped each other to form at least one cavity 100' therebetween. For example, the first layer 10' is embodied as an outer layer and the second layer 20' is embodied as an inner layer. The cavity 100' is formed and surrounded by an inner wall of the second layer 20'.

The fusion panel 1' comprises a first panel member 30' and a second panel member 40', wherein edges of the first panel member 30' and the second panel member 40' are connected to each other to form at least one cavity 100'.

The first panel member 30' can be configured to have a substantial planar, flat, or smooth structure. Generally, the second partial panel 40' can be configured to have a substantial planar, flat or smooth structure. Of course, the first panel member 30' or the second panel member 40' can also be made with any texture according to actual requirements. The first panel member 30' and the second panel member 40' can be used as desk panels, wall panels, floor panels, or roof panels, and should not be limited for the other usages.

The first panel member 30' is constructed to have at least one of a portion of the first layer 10' and a portion of the second layer 20'. The second panel member 30' is constructed to have at least one of a portion of the first layer 10' and a portion of the second layer 20'.

In other words, when the size of the first layer 10' is smaller than the size of the second layer 20', the first panel member 30' is preferably constructed to have the first layer 10' and a portion of the second layer 20', wherein the second panel member 40' is constructed to have another portion of the second layer 20'. When the size of the second layer 20' is smaller than the size of the second layer 20', is preferably constructed to have a portion of the first layer 10' and the second layer 20', wherein the second panel member 40' is constructed to have another portion of the first layer 10'.

In one embodiment, an inner surface of the first layer 10' is completely overlapped with an outer surface of the second layer 20'. The first panel member 30' is constructed to have a portion of the first layer 10' and the second layer 20' superimposed on each other, wherein the second panel member 40' is constructed to have other portion of the first layer 10' and the second layer 20' superimposed on each other.

The first panel member 30' and the second panel member 40' are positioned at opposite direction. When the first panel member 30' and the second panel member 40' are formed to have a two layer structure, the portion of the second layer 20' at of the first panel member 30' and the portion of the second layer 20' at the second panel member 40' are aligned in a face to face manner. Preferably, at least a portion of the first panel member 30' and at least a portion of the second panel member 40' are parallel to each other. For example, when the fusion panel 1' is embodied as a tabletop or a chair panel. It should be understood that the application of the fusion panel 1' should not be limited to furniture and home decoration, wherein the use of fusion panel 1' can also be applied to the field of decoration, such as automobiles, and can also be applied to the field of toys. The user is able to apply the fusion panel 1' to different fields according to actual requirements.

Figure 6:
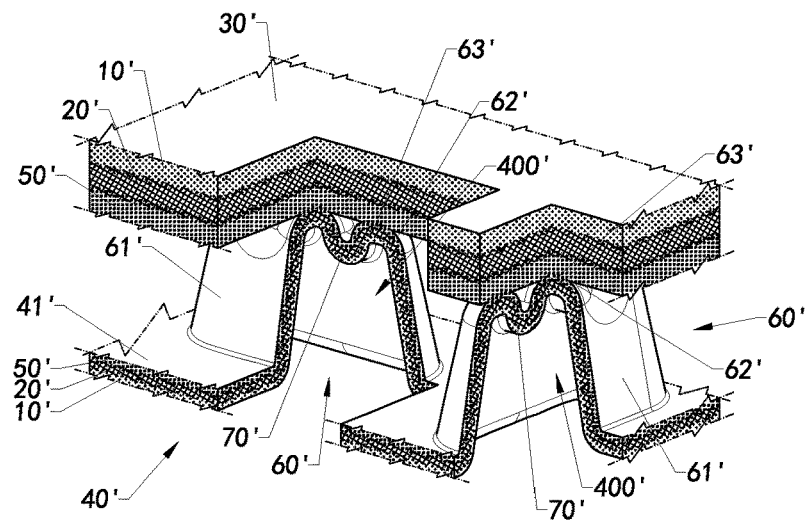
FIG. 6 is an enlarged sectional view of the blow molded panel at section I of FIG. 5B according to the above first preferred embodiment of the present invention.

Furthermore, as shown in FIG. 6, the fused layer 1' further comprises a third layer 50', wherein the third layer 50' is located at an inner side of the second layer 20'. In other words, the second layer 20' is located between the first layer 10' and the third layer 50'. The first panel member 30' is constructed to have at least one of a portion of the first layer 10', a portion of the second layer 20', and a portion of the third layer 50'. The second panel member 30' is constructed to have at least one of another portion of the first layer 10', another portion of the second layer 20', and another portion of the third layer 50'.

In one example, the first panel member 30' can be configured to have a single layer structure, a double layer structure or a three layer structure, wherein the third panel can be configured to have a single layer structure, wherein the second panel can be configured to have a double layer structure. The second panel member 40' is constructed to have at least a portion of the first layer 10' and at least a portion of the second layer 20' being superimposed on each other. Alternatively, at least a portion of the first layer 10' and at least a portion of the third layer 50' are superimposed on each other, Alternatively, at least a portion of the second layer 20' and the third layer 50' are superimposed on each other. The first panel member 30' can be configured to have a single layer structure, a double layer structure or a three layer structure, wherein the third panel member 50' can be configured to have a three layer structure or a multi-layer structure.

The second layer 20' and the first layer 10' are fused with each other at a connection thereof, and the second layer 20' and the third layer 50' are fused with each other at a connection thereof. In other words, the first layer 10' and the third layer 50' will not required for being fused with each other, wherein the second layer 20' functions as a connecting means to tightly connect the first layer 10' and the third layer 50' with each other.

Furthermore, the fusion panel 1' provides a first function, a second function and a third function, wherein the first layer 10' is configured to have the first function, the second layer 20' is configured to have the second function, and the third layer 10' is configured to have the third function. In other words, the fusion panel 1' provides all the first function, the second function and the third function by fusing the first layer 10', the second layer 20' and the third layer 50' to compensate the weakness of each other, so as to reduce the requirement for each layer of the fusion panel 1'.

For example, the first layer 10' of the fusion panel 1' is configured to have the first function of high surface strength, scratch resistance and oil resistance. The second layer 20' of the fusion panel 1' is configured to have the second function of energy absorbing structure or a material with high rigidness, which can effectively absorb any external force applied to the fusion panel 1' due to the impact or drop thereof. The third layer 50' of the fusion panel 1' is configured to have the third function of low thermoplastic shrinkage ratio and frame support.

The colors of the first layer 10', the second layer 20' and the third layer 50' can be the same or different. Preferably, the second layer 20' and the third layer 50' can be configured to have mixed colors because the second layer 20' and the third layer 50' of the fusion panel 1' are difficult to be seen.

The first layer 10', the second layer 20' and the third layer 50' can be made of same material or different materials. When the first layer 10' is embodied as an outer layer, the second layer 20' is embodied as an intermediate layer, and the third layer 50' is embodied as an inner layer, the first layer 10' is made of high density polyethylene, the second layer 20' is made of a mixture of high density polyethylene and calcium carbonate or a mixture high density polyethylene and glass fiber, and the third layer 50' is made of metallocene polyethylene. The second layer 20' as the intermediate layer and the third layer 50' as the inner layer are difficult to be seen from outside, such that the color and luster requirements for the second layer 20' and the third layer 50' can be reduced. Therefore, the second layer 20' and the third layer 50' can also be made of recycled plastic to reduce the manufacturing costs.

When the first layer 10' of the fusion panel 1' is made of high density polyethylene, the related parameters of the high density polyethylene are melting rate: 1.5 g/10 min, bending strength: 900 MPa, and Shore D69.

When the second layer 20' of the fusion panel 1' is made of the mixture of high density polyethylene and calcium carbonate, the mass percentage of calcium carbonate is 15-30%, and the mass percentage of high density polyethylene is 70-85%, wherein the related parameters of high density polyethylene are melting rate: 0.35 g/10 min, bending strength 1050 MPa, Shore D63.

When the second layer 20' of the fusion panel 1' is made of the mixture of high density polyethylene and glass fiber, the mass percentage of glass fiber is 15-40%, and the mass percentage of high density polyethylene is 60-85%, wherein the related parameters of high density polyethylene are melting rate: 0.35 g/10 min, bending strength 1050 MPa, Shore D63.

When the third layer 50' of the fusion panel 1' is made of metallocene polyethylene, the related parameters of the metallocene polyethylene are melting rate: 2.0 g/10 min, elongation at break: longitudinal 420%, transverse 830%, tensile strength at break: longitudinal 62 MPa, transverse 25 MPa, dart impact strength <48 g, Elmendorf tear strength: longitudinal 21° C., transverse 430° C.

It should be understood that the composition of each layer of the fusion panel 1' should not be limited to the above example, wherein the second layer 20' can be embodied as a micro-foam layer to provide a buffering effect.

According to the preferred embodiment, the first panel member 30' of the fusion panel 1' is configured to have a three-layer structure, and the second partial panel 40' is configured to have a three-layer structure. When the first panel member 30' is positioned above the second panel member 40', the layer structure from top to bottom is configured as a portion of the first layer 10', a portion of the second layer 20', a portion of the third layer 50', another portion of the third layer 50', another portion of the second layer 20', and another portion of the first layer 10'. The cavity 100' is formed within the inner walls of the third layers 50'.

When the first panel member 30' of the fusion panel 1' is configured to have a double-layer structure, and the second panel member 40' is configured to have a double-layer structure, the second layer 20' is configured to have better impact resistance or to have better support strength.

Furthermore, the fusion panel 1' further comprises at least one supporting structure 60', wherein the supporting structure 60' is located in the cavity 100' to support the first panel member 30'. At least a portion of the second panel member 40' is extended toward the cavity to form the supporting structure 60', wherein the supporting structure 60' can be, but should not be limited to, protrusions, bumps, and ridges.

The supporting structure 60' can be configured to have a portion of the third layer 50' of the partial panel member 40', wherein the third layer 50' of the partial panel member 40' is inwardly extended to form the supporting structure 60'. The supporting structure 60' can be configured to have a portion of the second layer 20' and a portion of the third layer 50' of the partial panel member 40', wherein at least a portion of the second layer 20' and at least a portion of the third layer 50' of the partial panel member 40' are inwardly and concurrently extended to form the supporting structure 60'.

According to the preferred embodiment, a portion of the first layer 10', a portion of the second layer 20' and a portion of the third layer 50' of the partial panel member 40' are inwardly and concurrently extended to form the supporting structure 60'. In other words, a portion of the second panel member 40' is stretched and recessed to form a recessed cavity 400' corresponding to the supporting structure 60'.

The second panel member 40' further comprises a second panel main body 41 and the supporting structure 60', wherein the supporting structure 60' is integrally extended to the second panel main body 41. Preferably, two or more of the supporting structures 60' are provided, wherein the supporting structures 60' are spaced apart from each other in a predetermined interval.

The recessed cavity 400' is formed at the surface of the second panel member 40', wherein the supporting structures 60' are configured correspondingly to the recessed cavities 400' respectively. In fact, at least a portion of the second panel member 40' is recessed to form the supporting structure 60'.

The recessed cavity 400' is configured to have a W-shaped cross section, and the overall shape thereof is configured to have an oblong shape with two arc-shaped ends, wherein peripheral walls of the recessed cavity 200' are upwardly and inwardly extended as inclined walls to form the supporting structure 60' of the second panel member 20'.

The supporting structure 60' has an upper end and a lower end, wherein the upper end of the supporting structure 60' is configured to support the first panel member 30', and the lower end of the supporting structure 60' is connected to the second panel main body 41. A cross sectional area of the supporting structure 60' is gradually increased from the upper end of the supporting structure 60' to the lower end thereof around the second panel member 40'.

Particularly, the supporting structure 60' further comprises a supporting sidewall 61', as a surrounding wall, extended from the second panel main body 41 to encircle the recessed cavity 400', wherein the supporting sidewall 61' is extended inclinedly, such that a space formed within the supporting sidewall 61' at the upper end of the supporting structure 60' is smaller than a space formed within the supporting sidewall 61' at the lower end of the supporting structure 60'.

When the first panel member 30' is located above the second panel member 40', the supporting structure 60' formed by the second panel member 40' is configured to have a tapered shape with a larger base and a smaller top structure so as to provide a stable configuration of the supporting structure 60'.

The supporting structure 60' further comprises a supporting top wall 62' extended from the supporting sidewall 61', wherein the supporting top wall 62' is extended to support at least a portion of an inner wall of the first panel member 30'.

Furthermore, the fusion panel 1' further comprises at least one reinforcing rib 70', wherein the reinforcing rib 70' is integrally provided on the supporting structure 60' to support the supporting structure 60'. The recessed cavity 400' is encircled and formed within the supporting sidewall 61' of the supporting structure 60', wherein the recessed cavity 400' can be seen from an outer side of the second panel member 40'. The reinforcing rib 70' is disposed in the recessed cavity 400' and is extended two sides of the supporting sidewall 61'.

In one embodiment, the supporting structure 60' has a narrow elongated shape, wherein the reinforcing ribs 70' is extended at a width direction of the supporting structure 60'. More than one reinforcing ribs 70' is provided, for example, two, three or more of the reinforcing ribs 70'.

According to this embodiment, each of the supporting structures 60' is provided with a pair of reinforcing ribs 70', wherein the reinforcing ribs 70' are horizontally extended to across a bottom of the recessed cavity 200' which is the corresponding top of the supporting structure 60'.

The reinforcing rib 70' is formed in a U-shaped wave manner, wherein the reinforcing rib 70' can be integrally extended to the supporting structure 60', or can be formed by outwardly extending at least a portion of the supporting structure 60'.

It is worth mentioning that the wave-shaped structure of the reinforcing rib 70' is the best reinforcing structure, such that the two wave-shaped reinforcing rib 70' in pair will form the supporting structure 60' with three-peak wave configuration, which greatly strengthens the second panel member 40' to provide the impact resistance and to enhance the rigidity.

Figure 7A:
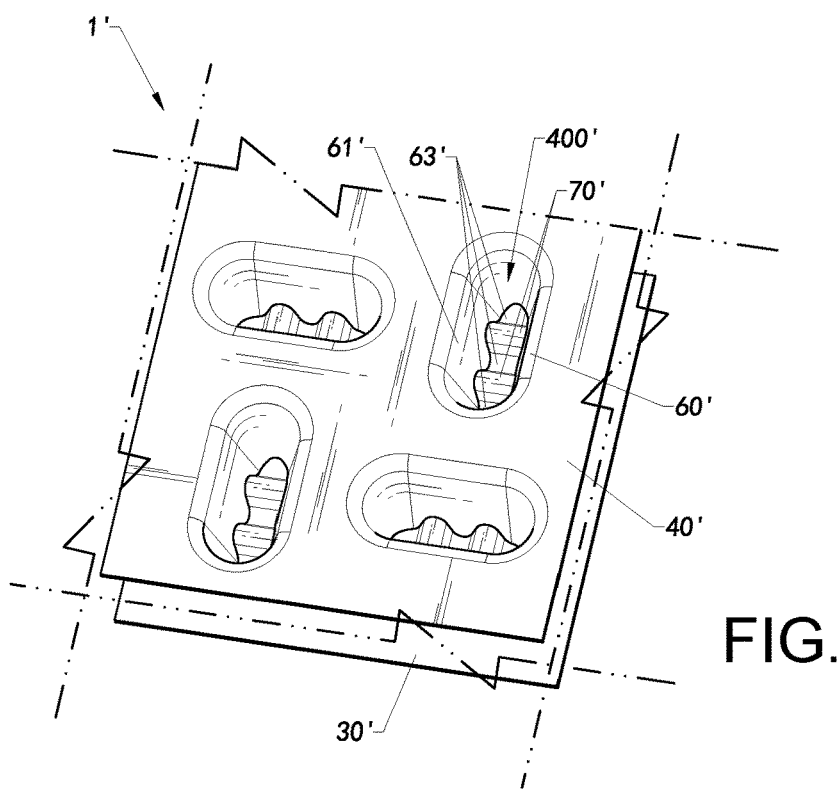
FIG. 7A is an enlarged sectional view of the blow molded panel at section J of FIG. 5B according to the above first preferred embodiment of the present invention.
Figure 7B:
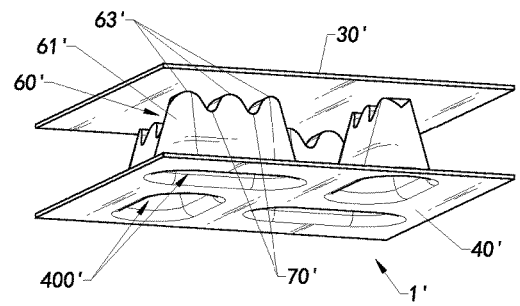
FIG. 7B is an enlarged perspective view of the blow molded panel at section J of FIG. 5B according to the above first preferred embodiment of the present invention.
Figure 7C:
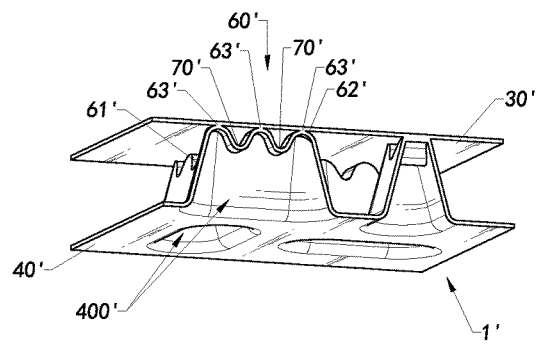
FIG. 7C is another enlarged sectional view of the blow molded panel at section J of FIG. 5B according to the above first preferred embodiment of the present invention.

The second panel member 20' is formed with at least one contact peak point 63' at the supporting top wall 62', wherein the contact peak point 63' is located higher than the surrounding portion and is close to the first panel member 30'. Particularly, at least a portion of the second panel member 40' is extended toward the cavity, which is extended toward the first panel member 30' to define the peak point 63' at the second panel member 20'. Accordingly, the portion of the second panel member 40' is stretched and recessed toward the first panel member 30' until the third layer 50' of the second panel member 40' and the third layer 50' of the first panel member 30' are fused with each other to form the peak point 63'. The first panel member 30' is supported at a position of the peak point 63'. At least a portion of the second panel member 20' is formed in a wave form to define the peak point 63'. The number of peak point 63' can be varied and configured with a predetermined interval when two or more peak points 63' are formed. The reinforcing ribs 70' and the peak points 63' are located within the recessed cavity 400' and are configured in a concave-convex arrangement, as shown in FIG. 7A, such that the reinforcing ribs 70' and the peak points 63' are alternating with each other to form the contact supporting structure 60'.

In other words, the peak points 63' are formed with the supporting structure 60'. At least a portion of the supporting structure 60' is outwardly extended to form the reinforcing rib 70' with two spaced apart peak points 63'.

As shown in FIGS. 5A to 7C, the supporting structure 60' is configured to have three peaks to form three peak points 63'. At the position of each of the supporting structure 60', the third layer 50' of the second panel member 40' is stretched and recessed to the third layer 50' of the first panel member 30' and is fused to the third layer 50' of the first panel member 30' to form an integrated body during the blow molding process. Therefore, the second panel member 40' is combined with the first panel member 30' by the peak points 63' of the supporting structure 60' in order to form a hollow panel. Accordingly, the second panel member 40' is configured in a wave form with three peak structure of the supporting structure 60' to form the reinforcing ribs 70'. Since the peak points 63' are coupled at the first panel member 30', the reinforcing support and structure of the first panel member 30' will be formed. The external impact and force applied to the first panel member 30' will be directly and evenly distributed to the second panel member 40' so as to provide a supporting force to the first panel member 30'. Furthermore, the cavity 100' between the first panel member 30' and the second panel member 40' is configured to provide cushioning and shock absorbing effects.

Figure 5A:
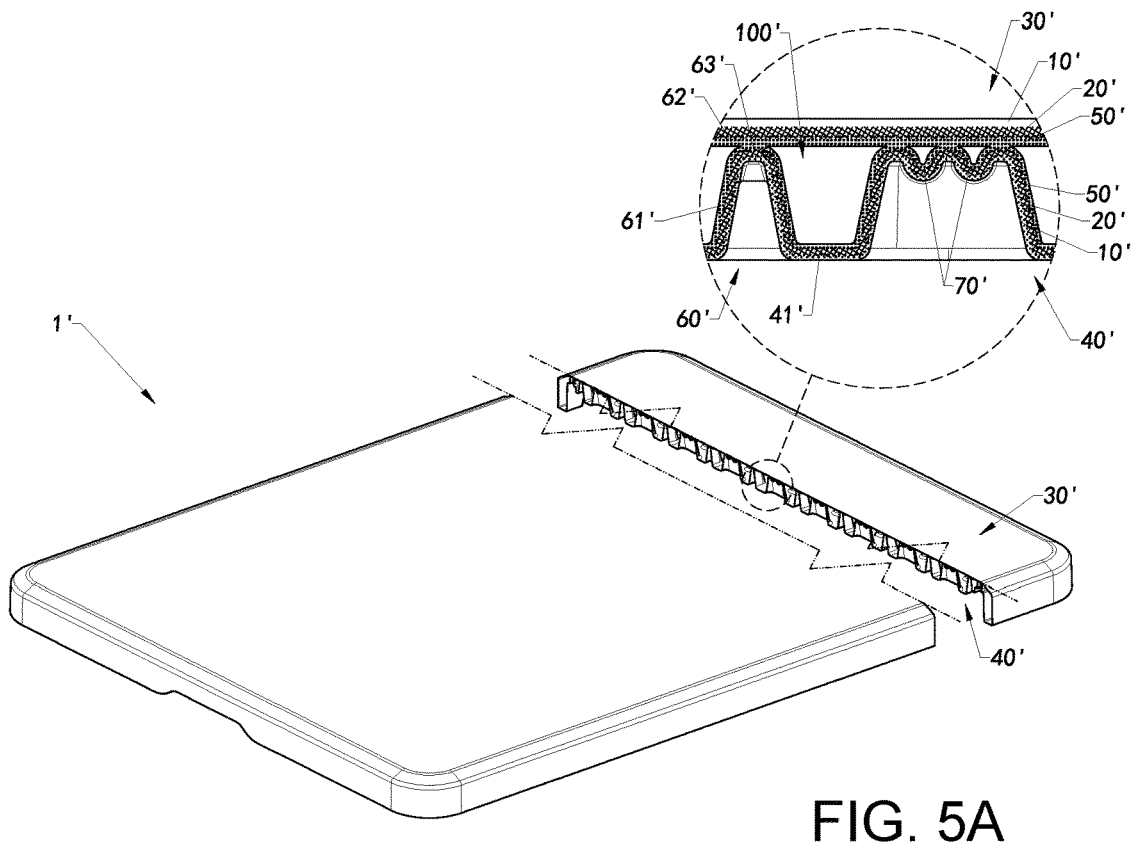
FIG. 5A is a sectional view of the blow molded panel according to the above first preferred embodiment of the present invention.
Figure 5B:
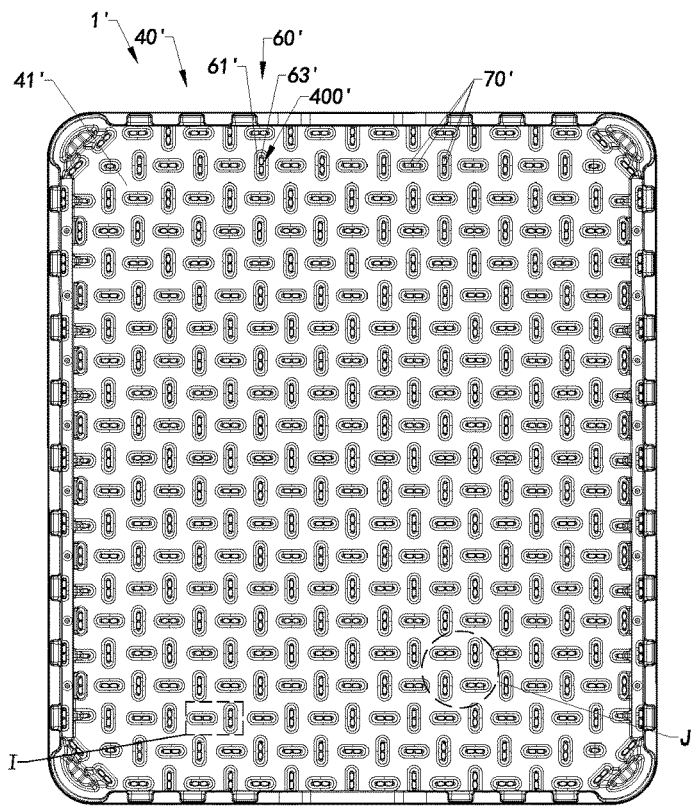
FIG. 5B is a bottom view of the blow molded panel according to the above first preferred embodiment of the present invention.

As shown in FIG. 5B, a plurality of supporting structures 60' are evenly distributed in the vertical and horizontal directions and are spaced apart at an even interval, such that the vertical extending supporting structures 60' and the horizontal extending supporting structures 60' are alternating with each other. Therefore, the material cost and the overall weight of the fusion panel 1' will be substantially reduced to have the hollow structure. On the other words, the fusion panel 1' provides an impact resistant and rigid structure that crosses the vertical and horizontal directions. Furthermore, through the peak points 63' of each of the supporting structures 60', the multiple joints between the first panel member 30' and the second panel member 40' are evenly distributed and formed to fuse the first panel member 30' and the second panel member 40'. Therefore, the first panel member 30' and the second panel member 40' are integrated with each other, such that the external impact and force on the first panel member 30' can be directly and evenly distributed to the second panel member 40' so as to evenly distribute the external impact and force. Then, once the external impact and force is evenly distributed at the fusion panel 1', the external impact and force will be transferred to the ground via a panel supporting structure, such as supporting legs supported on the ground.

Two or more of the peak points 63' are preferably formed by one supporting structure 60'. When two or more supporting structure 60' are provided, the supporting structure 60' may have the same or different numbers of the peak points 63'. For example, one of the supporting structure 60' may have the same or different numbers of the peak points 63'. As an example of this embodiment, one of the supporting structure 60' is formed with three contact peak points 63', while another supporting structure 60' is also formed with three contact peak points 63'.

Preferably, the contact peak points 63' formed by the supporting structure 60' of the second partial panel member 40' are located at the same elevated position to have the same height to enhance the flatness and support for the first panel member 30'.

The contact peak 63' is formed to create a gap between the supporting structure 60' and the first panel member 30' to enhance heat dissipation during the manufacturing process.

It should be understood that the supporting top wall 62' of the supporting structure 60' can also form as a flat surface to completely integrate with the inner wall of the first panel member 30'.

It is worth mentioning that the reinforcing rib 70' can be formed by outwardly protruding the supporting top wall 62' of the supporting structure 60', such that, the reinforcing rib 70 is formed without increasing the weight of the fusion panel 1'.

Furthermore, when the supporting top wall 62' is protruded outwardly to form the reinforcing rib 70', the contact peak 63' is formed at the supporting structure 60'. The protruded reinforcing rib 70' is defined between a concave portion between two adjacent contact peak points 63' of the supporting structure 60'.

Two or more supporting structures 60' are provided, wherein the supporting structures 60' are provided at a small area, a large area, or an entire second panel main body 41 of the second panel member 40'. Some of the supporting structures 60' can be configured to have substantially the same size, shape, configuration or arrangement. The supporting structures 60' are arranged in a predetermined pattern. In this embodiment, the supporting structures 60' are extended to support the first panel member 30', such that the first panel member 30' has substantially similar properties and characteristics, such as flatness, uniformity, and consistency, strength, hardness, etc.

It should be understood that the number of the supporting structures 60' is configured corresponding to the size of the first panel member 30'. When incorporating with a smaller size of the first panel member 30', the number of the supporting structures 60' can be reduced, for example, only one supporting structure 60'. When incorporating with a larger size of the first panel member 30', the number of the supporting structures 60' can be increased to distribute at the first panel member 30'.

The supporting structures 60' are arranged in an interval manner. It is worth mentioning that in this embodiment, since each of the supporting structures 60' has a narrow elongated shape, the adjacent supporting structures 60' are spaced apart from each other and are configured in a staggered manner. For example, one of the supporting structure 60' is extended in the longitudinal direction, and the adjacent supporting structure 60' is extended in the transverse direction. When the external force is applied at the fusion panel 1' along a length direction of one of the supporting structures 60' and along a width direction of the adjacent supporting structure 60' at the same time, the impact of the fusion panel 1' will be substantially reduced. It should be understood that only a predetermined number of supporting structures 60' are configured in a staggered manner that the supporting structures 60' are extended perpendicular to each other along the length directions.

It is worth mentioning that if the contact area between the supporting structure 60' and the inner wall of the first panel member 30' is too large, the supporting structure 60' and the inner wall of the first panel member 30' will affect heat dissipation during the manufacturing process. if the contact area between the supporting structure 60' and the inner wall of the first panel member 30' is too small during the manufacturing process, the supporting structure 60' may not sufficiently support the first panel member 30'. Therefore, the contact area between the supporting structure 60' and the inner wall of the first panel member 30' must be configured in a predetermined range.

Generally speaking, for the conventional panel, as the number of supporting structures 60' increases and as the thickness of the supporting structure 60' becomes thicker, the support for the inner wall of the first partial panel 30' will increases, and the weight of the fusion panel 1' will be heavier. In this embodiment, as the number of supporting structures 60' increases, the weight of the fusion panel 1' will not be heavier and the thickness of the supporting structure 60' will not need to be increased to increase the supporting strength.

The supporting structure 60' is constructed to have at least one of a portion of the first layer 10', a portion of the second layer 20', and a portion of the third layer 50'. The structure of the supporting structure 60' of the second panel member 40' can be the same or different from the structure of the second panel main body 41' thereof. In this embodiment, the supporting structure 60' and the second panel main body 41' are both configured to have three layer structure and are constructed to have a portion of the first layer 10', a portion of the second layer 20', and a portion of the third layer 50'.

For the conventional panel constructed to have a single layer structure, one material is generally used for the entire panel. In other words, the single material of the convention panel must achieve the first, second and third functions, such that the requirement of the material will be extremely high and the material cost of the conventional panel is very expensive. In this embodiment, the supporting structure 60' is constructed to have a portion of the first layer 10', a portion of the second layer 20' and a portion of the third layer 50' being fused with each other, such that the first layer 10', the second layer 20' and the third layer 50' are configured to achieve the first, second and third functions respectively.

The supporting strength of the conventional panel is enhanced by increasing the weight thereof, such that it is difficult to improve the supporting strength and at the same time to achieve other properties. According to the preferred embodiment, the strength enhancement of the supporting structure 60' is not restricted by the first layer 10' and the second layer 20'. The strength of the supporting structure 60' is achieved by the third layer 50', wherein the supporting structure 60' does not need to increase its weight to enhance the supporting strength. In other words, the supporting structure 60' can be made thinner. Therefore, not only the entire fusion panel 1' can be made lighter, but also the supporting structure 60' of the fusion panel 1' can also be made lighter.

In addition, the first layer 10', the second layer 20', and the third layer 50' are used with each other to further reduce the thickness of the fusion panel 1'.

Further, the weight of the second panel member 40' of the fusion panel 1' will not be increased in the process of forming the supporting structure 60'. The second panel member 40' can be stretched or pressed to be recessed into the cavity 400' to form the supporting structure 60'. In other words, the weight of the second panel member 40' will not be changed, but the material thereof is stretched to form the supporting structure 60' so as to ensure no additional material of the second panel member 40' being added to form the supporting structure 60'. The greater the number of the supporting structure 60', the greater the support of the first panel member 30'.

Furthermore, since the supporting structure 60' is formed by stretching at least a portion of the second panel member 40', the second panel main body 41 is correspondingly formed to further reduce the thickness of the supporting structure 60' so as to ensure the heat dissipation of the contacting area between the supporting structure 60' and the inner wall of the first panel member 30'.

Since the peak point 63' is formed at the supporting structure 60', the contacting area between the supporting structure 60' and the inner wall of the first panel member 30' will be smaller than the contacting area between two panels in a surface-to-surface engagement, so as to enhance the heat dissipation between the supporting structure 60' and the first panel member 30'.

It is worth mentioning that when the fusion panel 1' is configured to have a plurality of supporting structures 60', wherein the entire cavity 100' between the first panel member 30' and the second panel member 40' is partitioned by the supporting structures 60' to form a plurality of smaller cavities 100'. The cavities 100' between the first panel member 30' and the second panel member 40' can communicate with each other to enhance uniform heat dissipation between the first panel member 30' and the second panel member 40'.

Generally speaking, for the conventional panel, when the contacting area between the support structure 60' and the first panel member 30' is enlarged, it is difficult to dissipate heat at the contacting area between the supporting structure 60' and the first panel member 30' during the manufacturing process, such that the surface of the first panel member 30' will become uneven due to the heat dissipation. In this embodiment, when the contacting area between the supporting structure 60' and the first panel member 30' is enlarged, the heat dissipation of the contacting between the supporting structure 60' and the first panel member 30' will not changed or reduced.

Particularly, the supporting structure 60' is constructed to have at least a portion of the first layer 10', at least a portion of the second layer 20' and at least a portion of the third layer 50'. The first panel member 30' is constructed to have at least a portion of the first layer 10', at least a portion of the second layer 20', and at least a portion of the third layer 50'. At least a portion of the supporting structure 60' is contacted and fused with the first panel member 30'.

In other words, it is supposed that the thickness of the supporting structure 60' at the peak point 63' is set as h, and the thickness of the first panel member 30' is set as H. Since at least a portion of the supporting structure 60' is fused with the first panel member 30', the thickness at the connection of the first panel member 30' and the supporting structure 60' is less than H+h, i.e. the sum of the thickness of the supporting structure 60' and the thickness of the first panel member 30'. In other words, the supporting structure 60' is not only biased against the first panel member 30' but also fused with the first panel member 30', such that the thickness at the connection of the first panel member 30' and the supporting structure 60' will be reduced so as to enhance the heat dissipation at the supporting structure 60'.

Furthermore, in this embodiment, at least a portion of the third layer 50' of the supporting structure 60' is fused to at least a portion of the third layer 50' of the first panel member 30'. It should be understood that, in another embodiment of the present invention, a portion of the third layer 50' and a portion of the second layer 20' of the supporting structure 60' can be fused with a portion of the third layer 50' of the first panel member 30' or can be fused with a portion of the second layer 20' and the third layer 50'. It should be understood that the fusing depth of the supporting structure 60' and the first panel member 30' can be selectively adjusted by changing the relative position of the first panel member 30' and the second panel member 40', or by controlling the stretching length of the supporting structure 60'.

Generally speaking, for the conventional panel, if at least a portion of the supporting structure 60' is fused with at least a portion of the first panel member 30', the thickness at the connection area of the first panel member 30' and the first panel member 30' is larger than the thickness or other areas of the first panel member 30', such that the thicker panel will affect the heat dissipation to make the surface of the first panel member 30' uneven.

On the other hand, in this embodiment, the first layer 10' of the first panel member 30' can be maintained in a flat manner. Since the first panel member 30' is constructed to have at least a portion of the first layer 10', at least a portion of the second layer 20' and at least a portion of the third layer 50', the third layer 50' can be made of a material with a low heat shrinkage ratio, such that the third layer 50' of the first panel member 30' will not be shrunk significantly. Furthermore, the first layer 10' and the third layer 50' is separated by the second layer 20' is to keep the flatness of the first layer 10'.

In other words, the flatness of the first panel member 30' of the fusion panel 1' is guaranteed while the connection strength of the supporting structure 60' and the first panel member 30' is maintained.

According to the present invention, the present invention further provides a method of manufacturing the fusion panel 1', which comprises the following steps.

Form the first layer 10' and the second layer 10' of the fusion panel 1'.

Form the first panel member 30' and the second panel member 40' with a hollow structure, wherein edges of the first panel member 30' and the second panel member 40' are fused with each other, such that the first panel member 30' is spacedly overlapped on the second panel member 40' to form the hollow structure, wherein the first panel member 30' is constructed to have at least one of a portion of the first layer 10' and a portion of the second layer 20', wherein the second panel member 30' is constructed to have at least one of another portion of the first layer 10' and another portion of the second layer 20', wherein at least a portion of the second panel member 40' is extended toward the first panel member 30' to form at least one supporting structure 60' to support the first panel member 30'.

According to the preferred embodiment, the step of forming the first panel member 30' and the second panel member 40' further comprises the following steps.

Overlap the first layer 10' with the second layer 20', wherein the first layer 10' and the second layer 20' are fused with each other.

From a space between the first layer 10' with the second layer 20' to form the first panel member 30' ad the second panel member 40' with a hollow structure therebetween.

It should be understood that the first layer 10' and the second layer 20' can be formed separately, for example, via extrusion molding, wherein each of the first layer 10' and the second layer 20' is formed in a fluid state, such that the first layer 10' and the second layer 20' can fuse with each other.

The first layer 10' and the second layer 20' are formed separately and then are fused with each other. In one example, the first layer 10' and the second layer 20' are molded and formed separately, then the first layer 10' is overlapped on the second layer 20', then the overlapped first and second layers 10', 20' are heated at the same time to fuse the first and second layers 10', 20' with each other.

Alternatively, the first layer 10' and the second layer 20' can be fused with each other while being formed. For example, the first layer 10' and the second layer 20' are co-extruded and fused at the same time.

Accordingly, the first layer 10' and the second layer 20' can be formed by forming the first layer 10' first, and then forming the second layer 20', wherein the second layer 20' is fused to the first layer 10' while the second layer 20' is formed. For example, the first layer 10' is formed in a fluid state, wherein the material of the second layer 20' is placed on the first layer 10' to form the second layer 20' being overlapped thereon. When the second layer 20' is being formed, the first layer 10' and the second layer 20' are fused with each other.

Furthermore, it should be understood that the second panel member 40' is formed at the same time when the second layer 20' is formed, then the first layer 10' is placed on the second layer 20' to form first panel member 30', such that the first panel member 30' and the second panel member 40' are formed correspondingly. In other words, the cavity 100' is formed and encircled within the second layer 20' while at least a portion of the second layer 20' is extended into the cavity 100' to form the supporting structure 60' at the same time. Then, the first layer 10' is formed on the outer surface of the second layer 20' and at least a portion of the first layer 10' is extended into the cavity 100' along with the portion of the second layer 20' to form the supporting structure 60', such that the first panel member 30' and the second panel member 40' are formed with the hollow structure.

According to the preferred embodiment, the step of forming the first panel member 30' and the second panel member 40' further comprises the following steps.

Close the first panel member 30' and the second panel member 40' with each other, wherein the cavity 100' is formed between the first panel member 30' and the second panel member 40'.

Fuse at least a portion of the supporting structure 60' with the first panel member 30'.

It should be understood that the second panel member 40' is formed at the same time when the second layer 20' is formed, wherein at least a portion of the supporting structure 60' is formed and fused with at least a portion the second layer 20' when the second layer 20' is formed. In other words, the fusing process of the supporting structure 60' and the first panel member 30' can be performed after the overlapping process of the first and second layers 10', 20' is completed. Alternatively, the fusing process of the supporting structure 60' and the first panel member 30' can be performed when the inner layer of the fusion panel 1' is formed or after the inner layer of the fusion panel 1' is formed. In this example, the inner layer of the fusion panel 1' is embodied as the second layer 20'.

Alternatively, the method of manufacturing the fusion panel 1' comprises the following steps.

Form the first layer 10', the second layer 20' and the third layer 50'.

Form the first panel member 30' and the second panel member 40' with a hollow structure, wherein edges of the first panel member 30' and the second panel member 40' are fused with each other, such that the first panel member 30' is spacedly overlapped on the second panel member 40' to form the hollow structure, wherein the first layer 10' is overlapped and fused with the second layer 20', wherein the second layer 20' is overlapped and fused with the third layer 50', wherein the first panel member 30' is constructed to have at least one of a portion of the first layer 10', a portion of the second layer 20' and a portion of the third layer 30', wherein the second panel member 30' is constructed to have at least one of another portion of the first layer 10', another portion of the second layer 20' and another portion of the third layer 50', wherein at least a portion of the second panel 40' is extended toward the first panel member 30' to form at least one supporting structure 60' to support the first panel member 30'.

Figure 8:
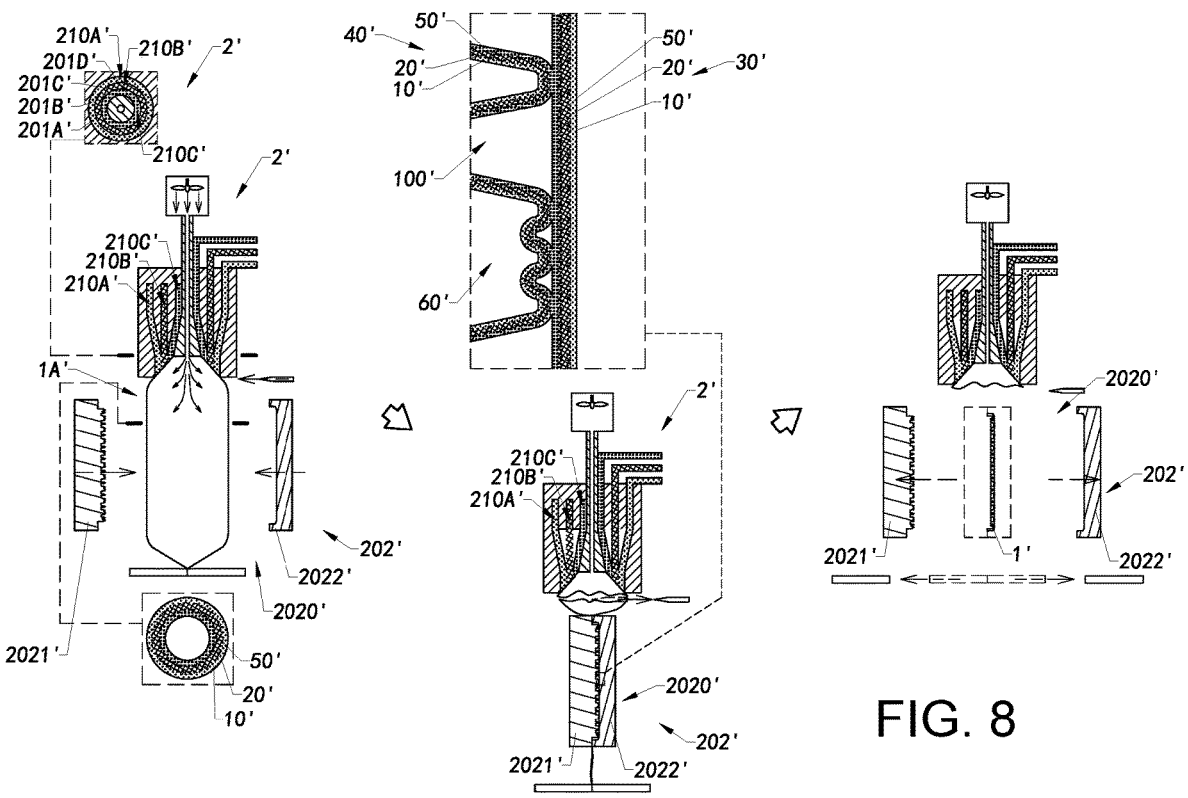
FIG. 8 is a flow diagram illustrating a manufacturing method of the blow molded panel according to the above first preferred embodiment of the present invention.

Referring to FIG. 8 of the drawings, the manufacturing process of the fusion panel 1' according to the above preferred embodiment of the present invention is illustrated.

First, provide a first raw material for the first layer 10' of the fusion panel 1', a second raw material for the second layer 20' of the fusion panel 1', and a third raw material for the third layer 50' of the fusion panel 1'. The first raw material, the second material, and the third material are different. Alternatively, it should be understood that at least two of the first raw material, the second material, and the third material are the same.

Heat the first raw material, the second raw material, and the third raw material until the first raw material, the second raw material, and the third raw material are formed in a fluid state to flow along a first feeding channel 210A', a second feeding channel 210B', and a third feeding channel 210C' of a fusion panel manufacturing equipment 2' respectively. Alternatively, the first raw material, the second raw material, and the third raw material in a fluid state are pushed to flow along the first feeding channel 210A', the second feeding channel 210B', and the third feeding channel 210C' respectively.

The first feeding channel 210A' is located at an outer side of the second feeding channel 210B'. The second feeding channel 210B' is located at an outer side of the third feeding channel 210C'. Preferably, the first feeding channel 210A', second feeding channel 210B' and the third feeding channel 210C' are embodied as annular channels each having a ring shape and are coaxially aligned with each other. It should be understood that the cross section of each of the first feeding channel 210A', the second feeding channel 210B', and the third feeding channel 210C' should not be limited to have a circular ring shape, it can be formed in an ellipse cross section or even a triangular ring cross section. It should be understood that the first feeding channel 210A', the second feeding channel 210B', and the third feeding channel 210C' can be configured at an eccentric manner. For example, a width of the second feeding channel 210B' formed at an interval between a first feeding pipe 201' and a second feeding pipe 201B' can be uneven, such that the thicknesses of the same layers of the fused layer 1' can be different.

The first feeding channel 210A' is formed at an interval between the first feeding pipe 201A' and the second feeding pipe 201B', wherein the first raw material is guided to flow along the first feeding channel 210A' and is extruded out of the first feeding channel 210A' at a first outlet thereof.

The second feeding channel 210B' is formed at an interval between the second feeding pipe 201B' and a third feeding pipe 201C', wherein the second raw material is guided to flow along the second feeding channel 210B' and is extruded out of the second feeding channel 210B' at a second outlet thereof.

The third feeding channel 210C' is formed at an interval between the third feeding pipe 201C' and an inner feeding pipe 201D', wherein the third raw material is guided to flow along the third feeding channel 210C' and is extruded out of the third feeding channel 210C' at a third outlet thereof.

The second feeding pipe 201B' is spacedly sleeved within the first feeding pipe 201A', wherein a distance between the first feeding pipe 201A' and the second feeding pipe 201B' is approximately equal to the thickness of the first layer 10'. The third feeding pipe 201C' is spacedly sleeved within the second feeding pipe 201B', wherein a distance between the second feeding pipe 201B' and the third feeding pipe 201C' is approximately equal to the thickness of the second layer 20'. The inner feeding pipe 201D' is spacedly sleeved within the third feeding pipe 201C', wherein a distance between the third feeding pipe 201C' and the inner feeding pipe 201D' is approximately equal to the thickness of the third layer 50'. The interior of the inner feeding pipe 201D' is configured for ventilation.

When the first raw material, the second raw material, and the third raw material are extruded at the first outlet, the second outlet, and the third outlet, the first layer 10', the second layer 20' and the third layer 50' are formed at the same time, wherein the first layer 10' is superimposed on the second layer 20' while the second layer 20' is superimposed on the third layer 50'.

An inner surface of the first layer 10' is contacted with an outer surface of the second layer 20', while an inner surface of the second layer 20' is contacted with an outer surface of the third layer 50'. Since the first raw material for the first layer 10', the second raw material for the second layer 20', and the third raw material for the third layer 50' are in fluid state, the first layer 10' and the second layer 20' are fused with each other while the second layer 20' and the third layer 50' are fused with each other.

The first layer 10', the second layer 20' and the third layer 50' are fused with each other to form a fused body 1A', wherein the fused body 1A' has a hollow structure that inner walls of the third layer 50' are not contacted with each other.

It should be understood that the first layer 10', the second layer 20' and the third layer 30' can be formed by co-extrusion, or can be extruded separately and then superimposed on each other.

When the fused body 1A' is downwardly drops from a predetermined elevated position and is then shaped in a molding die 202', wherein the molding die 202' is closed at two sides of the fused body 1A'. Accordingly, the molding die 202' comprises a left mold 2021' and a right mold 2022', wherein the left mold 2021' is moved to the right mold 2022' to a molding space 2020' of the molding die 202'.

After the fused body 1A' is guided into the molding space 2020', an airflow is introduced into the molding die 202', such that via an air pressure applied to the middle of the fused body 1A' by airflow, a portion of the fused body 1A' is biased against the left mold 2021' to form the first panel member 30' while another portion of the fused body 1A' is biased against the right mold 2022' to form the second panel member 40'. Under the air pressure, the first layer 10', the second layer 20' and the third layer 30' can be pressed to be closely fused with each other.

The molding die 202' further comprises at least a protrusion formed at an inner wall of the right mold 2022' to form the supporting structure 60' at the fused body 1A'. It is worth mentioning that after the left mold 2021' and the right mold 2022' of the molding die 202' are moved closely to each other, at the connection between the supporting structure 60' and the first panel member 30', a distance between the left mold 2021' and the right mold 2022' is set to be smaller than the sum of the thickness o of the supporting structure 60' sand the thickness of the first panel member 30', such that the supporting structure 60' in a fluid state and at least a portion of the first panel member 30' can be fused with each other.

After the molding die 202' is closed, the fused body is cooled and then demolded to form the blow molded fusion panel 1' with the hollow structure.

It should be understood that the manufacturing method of the fusion panel 1' should not be limited to the above examples. As an example of the second layer 20' embodied as a foam layer, after the first layer 10', the second layer 20' and the third layer 50' are fused with each other under the environmental conditions, such as temperature, pressure, or others, the second layer 20' is foamed to form the foam layer. Alternatively, the foaming of the second layer 20' can be controlled during the first layer 10', the second layer 20' and the third layer 50' being fused with each other.

Figure 9:
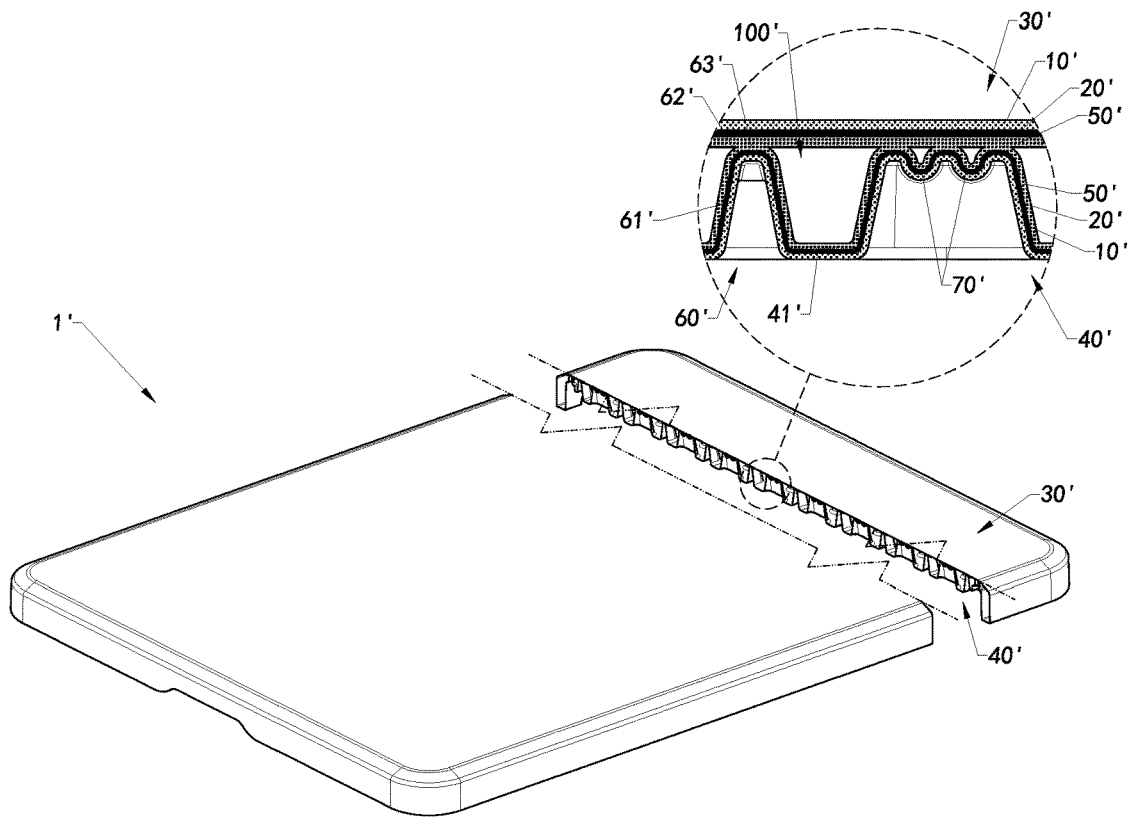
FIG. 9 is a perspective view of a blow molded panel according to a third preferred embodiment of the present invention.

Referring to FIG. 9, the fusion panel 1' according to a third preferred embodiment of the present invention is shown.

The fusion panel 1' is constructed to have the first layer 10', the second layer 20' and the third layer 50', wherein the second layer 20' is sandwiched between the first layer 10' and the third layer 50'.

The difference between the third embodiment and the above mentioned embodiment is that the second layer 20' according to the third embodiment mainly serves as a connecting medium. Since the first layer 10' cannot be directly integrated with the third layer 50', the second layer 50' is provided to fuse between the first layer 10' and the third layer 50', such that the first layer 10' and the third layer 50' can fused together.

Figure 10:
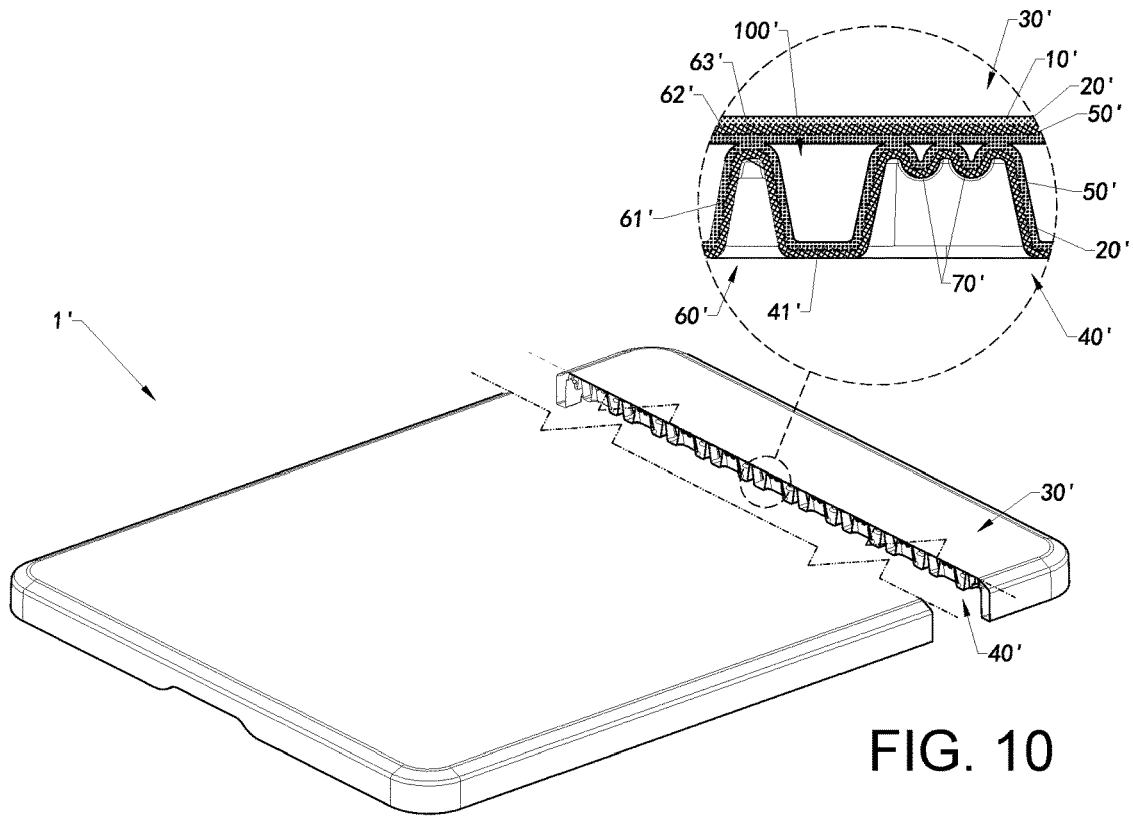
FIG. 10 is a perspective view of a blow molded panel according to a fourth preferred embodiment of the present invention.

Referring to FIG. 10, the fusion panel 1' according to a fourth preferred embodiment of the present invention is shown.

The fusion panel 1' is constructed to have the first layer 10', the second layer 20' and the third layer 50', wherein the second layer 20' is sandwiched between the first layer 10' and the third layer 50'.

The difference between the fourth embodiment and the above mentioned embodiment is that, according to the fourth embodiment, the first panel member 30' is constructed to have at least a portion of the first layer 10', at least a portion of the second layer 20', and at least a portion of the third layer 50', and the second panel member 40' is constructed to have at least a portion of the second layer 20' and at least a portion of the third layer 50'.

When the first panel member 30' is located above the second panel member 40', the layer configuration of the fused layer 1' from top to bottom is that a portion of the first layer 10', a portion of and the second layer 20', a portion of the third layer 50', another portion of the other third layer 50', and another portion of the second layer 20'.

A portion of the third layer 50' of the first panel member 30' can be fused with a portion of the third layer 50' of the second panel member 40'.

It should be understood that the number of layers in each location of the fusion panel 1' can be arranged according to requirements or actual need. The first panel member 30' and the second panel member 40' of the fusion panel 1' can be constructed to have four or more layers.

Figure 11:
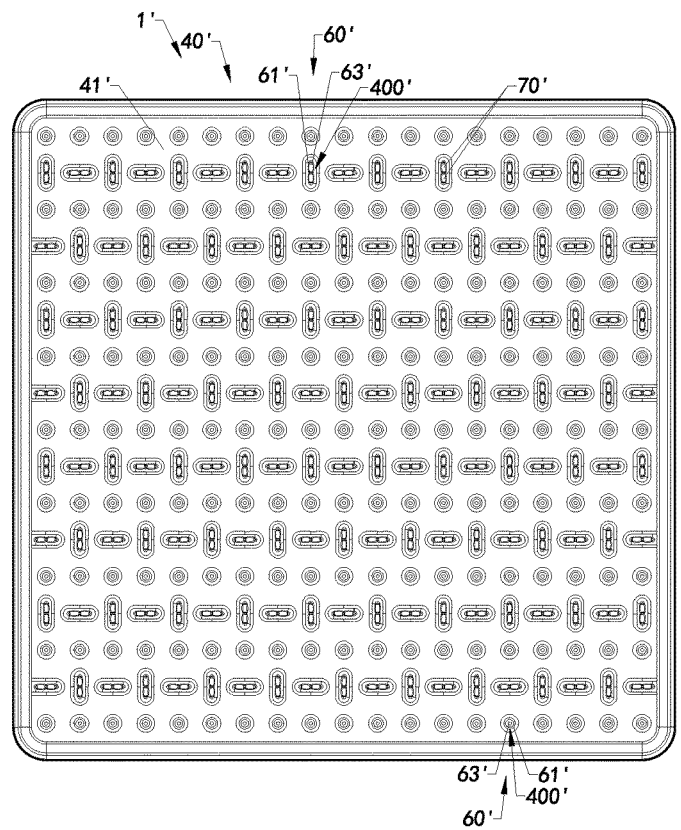
FIG. 11 is a perspective view of a blow molded panel according to a fifth preferred embodiment of the present invention.

Referring to FIG. 11, the fusion panel 1' according to a fifth preferred embodiment of the present invention is shown.

The difference between the fifth embodiment and the above mentioned embodiment is the supporting structure 60' of the fifth embodiment, wherein some of the supporting structures 60' are formed in a round shape, and some of the supporting structures 60' are formed in an elongated shape. One peak point 63' is provided when the supporting structure 60' is formed in a round shape. Multiple peak points 63' are provided when the supporting structure 60' is formed in an elongated shape. At least two of the supporting structures 60' are arranged in a staggered manner.

Figure 12:
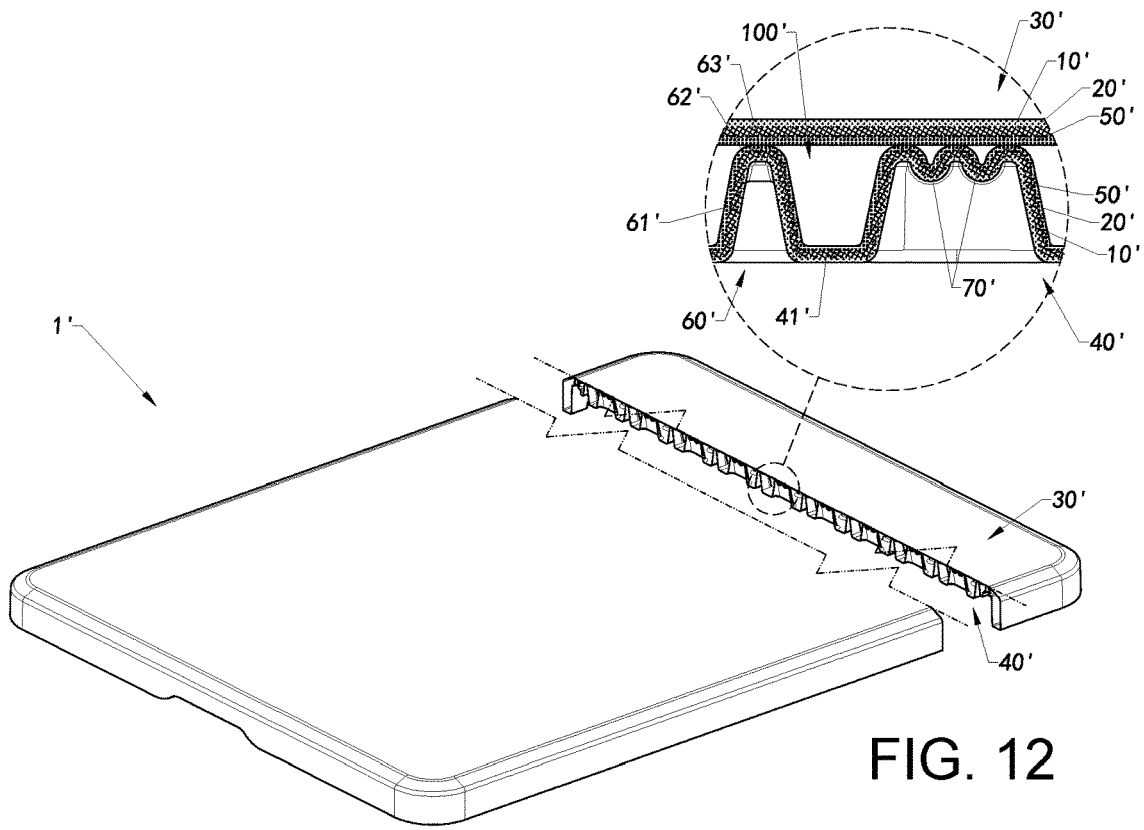
FIG. 12 is a perspective view of a blow molded panel according to a sixth preferred embodiment of the present invention.

Referring to FIG. 12, the fusion panel 1' according to a sixth preferred embodiment of the present invention is shown.

The difference between the sixth embodiment and the above mentioned embodiment is the supporting structure 60' according to the sixth embodiment. Accordingly, the supporting structure 60' is only biased against the inner wall of the first panel member 30'. In other words, the supporting structure 60' is only contacted with the first panel member 30' but not fused with the first panel member 30'. For example, during the molding process of the fusion panel 1', the depth of the supporting structure 60' is controlled to ensure the supporting structure 60' being only contacted with the first panel member 30'. Alternatively, by lower the temperature to reduce the fluidity of the first panel member 30' and the second panel member 40' when pressing the first panel member 30' and the second panel member 40', the supporting structure 60' is pressed close to the first panel member 30' but not fused with the first panel member 30'.

It should be understood that the supporting structure 60' is formed by the second panel member 40' and is extended to have a predetermined distance from the first panel member 30'. When a load is applied on the first panel member 30', the first panel member 30' is pressed downwardly to move closer to the second panel member 40' until the first panel member 30' is supported by the supporting structure 60'.

Figure 13:
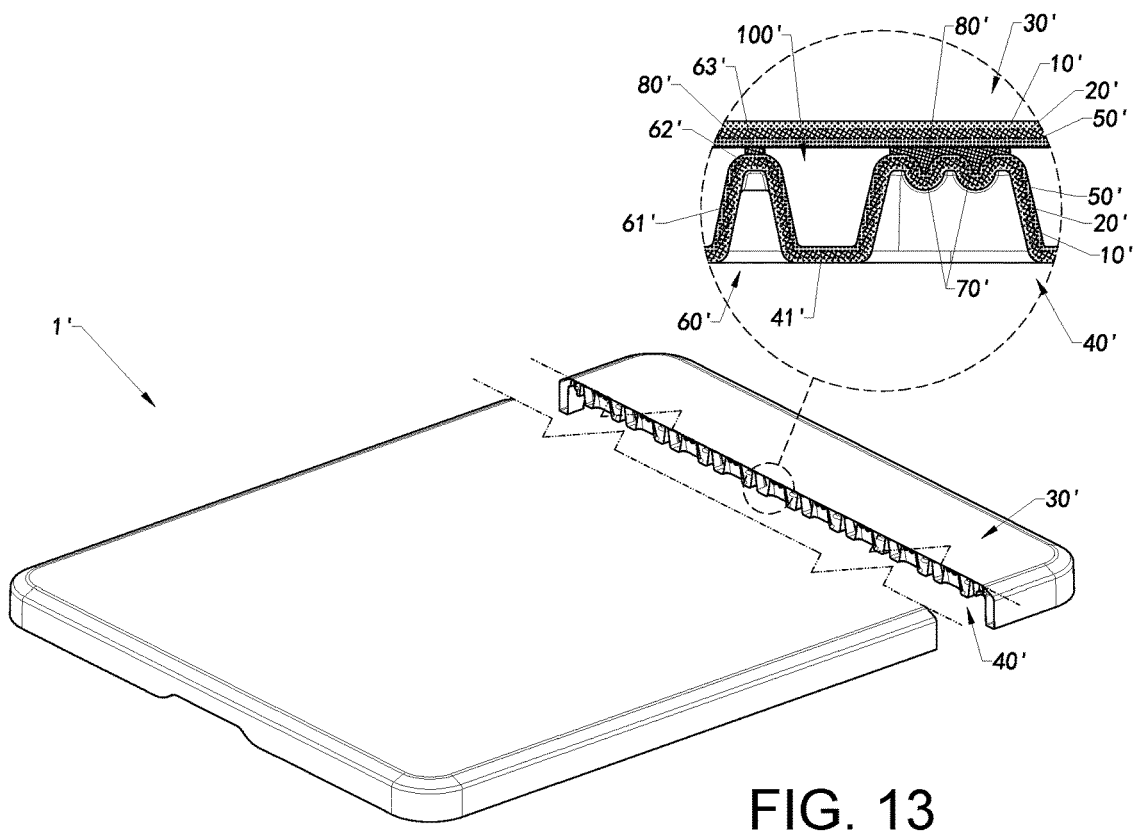
FIG. 13 is a perspective view of a blow molded panel according to a seventh preferred embodiment of the present invention.

Referring to FIG. 13, the fusion panel 1' according to a seventh preferred embodiment of the present invention is shown. The difference between the seventh embodiment and the above mentioned embodiment are the supporting structure 60' and the first panel member 30' according to the seventh embodiment.

The fusion panel 1' further comprises a filling layer 80', wherein the filling layer 80' is located between the supporting structure 60' and the first panel member 30'. The first panel member 30' is supported by the supporting structure 60' via the filling layer 80'. The filling layer 80' can serve as a connecting medium for fusing the support structure 60' and the first panel member 30', or can serve as a buffering medium for buffering between the support structure 60' and the first panel member 30'. The filling layer 80' can be injected between the supporting structure 60' and the first panel member 30' after the fusion panel 1' is formed. Alternatively, filling layer 80' can be extruded along with the first layer 10', the second layer 20' and the third layer 50'.

Figure 14:
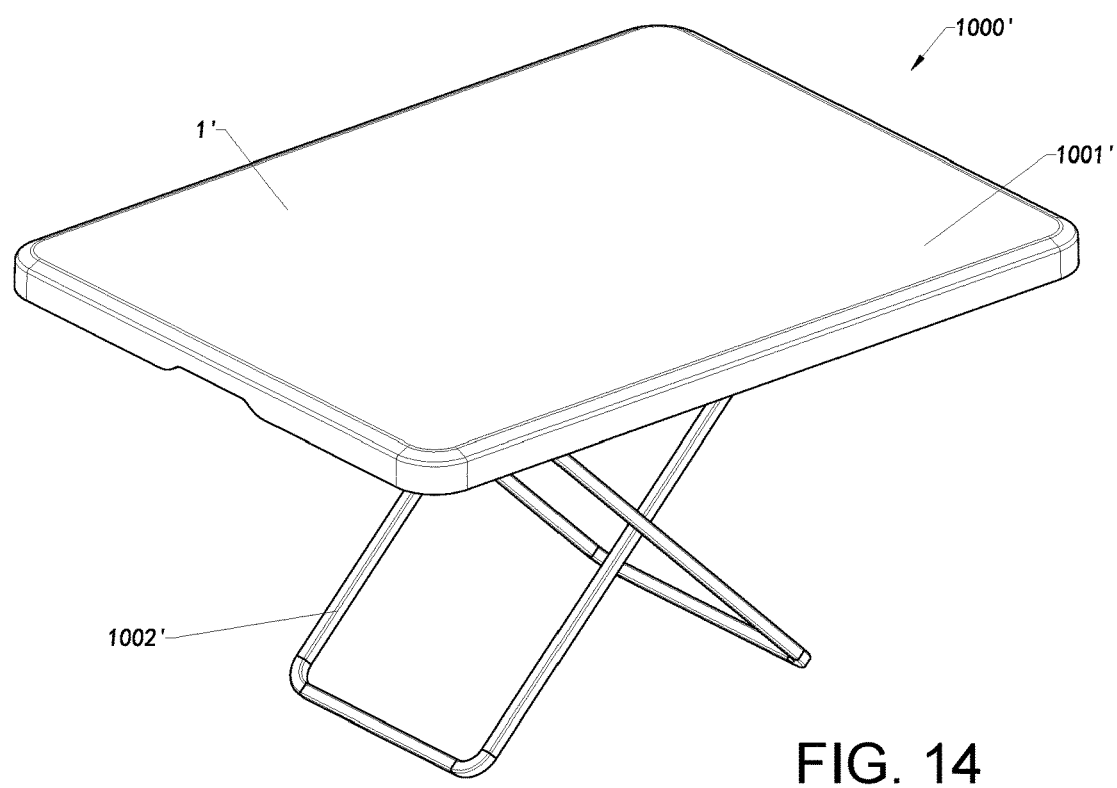
FIG. 14 is a perspective view of a table incorporating with the blow molded panel according to the above preferred embodiments of the present invention.

Referring to FIG. 14, as also referring to FIGS. 5A to 7C, a table 1000' according to the above preferred embodiments of the present invention is illustrated. The table 1000' comprises a tabletop 1001' and at least one leg device 1002', wherein the tabletop 1001' is supported by the leg device 1002', such that the tabletop 1001' is elevated at a predetermined height from a working surface. The leg device 1002' is arranged to rest on the working surface.

The tabletop 1001' is made by the fusion panel 1', wherein the fusion panel 1' is cut to form an entire tabletop 1001' or two or more fusion panels 1' are cut and combined to form the tabletop 1001'. The tabletop 1001' can be formed in, but should not be limited to, a circular shape, a square shape, and a triangular shape.

An upper side and a lower side of the tabletop 1001' can be configured to parallel with each other. That is, the first panel member 30' and the second panel member 40' of the fusion panel 1' are constructed to form the tabletop 1001', wherein at least a portion of the first panel member 30' and a least a portion of the second panel member 40' can be configured to parallel with each other.

It should be understood that the fusion panel 1' can be used in different fields, wherein the first panel member 30' and the second panel member 40' can be configured in a non-parallel manner. For example, the upper surface of the fused layer 1' can form in an arc shape while the lower surface of the fused layer 1' can be flat.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A blow molded fusion panel, comprising:
   first and second layers overlapped and fused with each other, wherein said first layer is made of a first material and said second layer is made of a second material;
   a third layer fused with said second layer to sandwich said second layer between said first layer and said third layer; and
   first and second panel members spaced apart from each other to define a cavity therebetween, wherein each of said first and second panel members is constructed by said first, second and third layers, wherein a plurality of different portions of each of said first layer, said second layer and said third layer of said second panel member is concurrently stretched and recessed into said cavity to form a plurality of supporting structures respectively, such that each of said supporting structures is constructed by said first, second and third layers, wherein said supporting structures are extended to bias against said first panel member so as to support said first panel member, wherein said cavity is formed between said third layer of said first panel member and said third layer of said second panel member, wherein said first layer of each of said first panel member and said second panel member is embodied as an outer layer, said third layer of each of said first panel member and said second panel member is embodied as an inner layer being made to provide frame support, said second layer of each of said first panel member and said second panel member is embodied as an intermediate layer being made to provide a buffering effect for said first layer and said third layer.

2. The blow molded fusion panel, as recited in claim 1, wherein said third layer of each of said supporting structures is fused with said third layer of said first panel member.

3. The blow molded fusion panel, as recited in claim 1, wherein a top of each of said supporting structures has a U-shaped waving structure to form two or more peak points biasing against said first panel member.

4. The blow molded fusion panel, as recited in claim 2, wherein a top of each of said supporting structures has a U-shaped waving structure to form two or more peak points biasing against said first panel member.

5. The blow molded fusion panel, as recited in claim 3, further comprising a plurality of reinforcing ribs, wherein each of said reinforcing ribs is integrally formed with each of said supporting structures at a position that said reinforcing rib is located between said peak points.

6. The blow molded fusion panel, as recited in claim 3, wherein each of said supporting structures comprises a supporting top wall defining said peak points thereat, and a supporting sidewall inclinedly extended from said supporting top wall to said second panel member so as to form a recessed cavity encircled within said supporting sidewall, wherein a size of said recessed cavity is reduced from said second panel member to said first panel member.

7. The blow molded fusion panel, as recited in claim 1, wherein said supporting structures are arranged in an interval manner and in a staggered manner.

8. The blow molded fusion panel, as recited in claim 1, wherein said second panel member is blow-molded to stretch and recess said portions thereof into said cavity to form said supporting structures for ensuring no additional material of said second panel member being added to form said supporting structures.

9. The blow molded fusion panel, as recited in claim 2, wherein said second panel member is blow-molded to stretch and recess said portions thereof into said cavity to form said supporting structures for ensuring no additional material of said second panel member being added to form said supporting structures.

10. A blow molded fusion panel, comprising:
    first and second layers overlapped and fused with each other, wherein said first layer is made of a first material and said second layer is made of a second material;
    a third layer fused with said second layer to sandwich said second layer between said first layer and said third layer; and
    first and second panel members spaced apart from each other to define a cavity therebetween, wherein each of said first and second panel members is constructed by said first layer, said second layer and said third layer, wherein a plurality of different portions of each of said first layer, said second layer and said third layer is concurrently stretched and recessed into said cavity to form a plurality of supporting structures respectively, wherein said supporting structures are extended to bias against said first panel member so as to support said first panel member, wherein said cavity is formed between said third layer of said first panel member and said third layer of said second panel member, wherein said first layer is made of high density polyethylene, wherein said third layer is made of metallocene polyethylene, wherein said second layer is made of a mixture of metallocene polyethylene and calcium carbonate or a mixture of high density polyethylene and calcium carbonate or a mixture high density polyethylene and glass fiber.

11. The blow molded fusion panel, as recited in claim 10, wherein said third layer of each of said supporting structures is fused with said third layer of said first panel member.

12. The blow molded fusion panel, as recited in claim 10, wherein a top of each of said supporting structures has a U-shaped waving structure to form two or more peak points biasing against said first panel member.

13. The blow molded fusion panel, as recited in claim 12, further comprising a plurality of reinforcing ribs, wherein each of said reinforcing ribs is integrally formed with each of said supporting structures at a position that said reinforcing rib is located between said peak points.

14. The blow molded fusion panel, as recited in claim 12, wherein each of said supporting structures comprises a supporting top wall defining said peak points thereat, and a supporting sidewall inclinedly extended from said supporting top wall to said second panel member so as to form a recessed cavity encircled within said supporting sidewall, wherein a size of said recessed cavity is reduced from said second panel member to said first panel member.

15. The blow molded fusion panel, as recited in claim 10, wherein said supporting structures are arranged in an interval manner and in a staggered manner.

16. The blow molded fusion panel, as recited in claim 10, wherein said plurality of different portions of said third layer of said second panel member are concurrently stretched and recessed along with said plurality of different portions of said first layer and said plurality of different portions of said second layer of said second panel member into said cavity to form said supporting structures respectively, such that each of said supporting structures is constructed by said first, second and third layers.

17. The blow molded fusion panel, as recited in claim 14, further comprising a plurality of reinforcing ribs, wherein each of said reinforcing ribs is integrally formed with each of said supporting structures at a position that said reinforcing rib is located between said peak points.

18. The blow molded fusion panel, as recited in claim 17, wherein each of said supporting structures comprises a supporting top wall defining said peak points thereat, and a supporting sidewall inclinedly extended from said supporting top wall to said second panel member so as to form a recessed cavity encircled within said supporting sidewall, wherein a size of said recessed cavity is reduced from said second panel member to said first panel member.

19. The blow molded fusion panel, as recited in claim 10, wherein said second panel member is blow-molded to stretch and recess said portions thereof into said cavity to form said supporting structures for ensuring no additional material of said second panel member being added to form said supporting structures.

\* \* \* \* \*